United States Patent
Zheng et al.

(10) Patent No.: US 12,261,496 B2
(45) Date of Patent: Mar. 25, 2025

(54) SIX-PHASE FLAT WIRE WAVE WINDING STRUCTURE, SIX-PHASE MOTOR, POWERTRAIN, AND VEHICLE

(71) Applicant: Huawei Digital Power Technologies Co., Ltd., Shenzhen (CN)

(72) Inventors: Hao Zheng, Shanghai (CN); Linpeng Yin, Shanghai (CN); Mengde Li, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 305 days.

(21) Appl. No.: 17/741,783

(22) Filed: May 11, 2022

(65) Prior Publication Data

US 2022/0329125 A1    Oct. 13, 2022

(30) Foreign Application Priority Data

May 14, 2021 (CN) .......................... 202110528805.3

(51) Int. Cl.
*H02K 3/28*    (2006.01)
*H02K 3/12*    (2006.01)

(52) U.S. Cl.
CPC ................. *H02K 3/28* (2013.01); *H02K 3/12* (2013.01)

(58) Field of Classification Search
CPC .. H02K 3/12; H02K 3/28; H02K 3/04; H02K 3/50; H02K 3/16; H02K 1/165; H02K 1/16; H02K 15/065; H02K 15/024; H02K 15/0478; H02K 15/066; H02K 15/0037; H02K 15/02; H02K 15/06; H02K 2213/03

See application file for complete search history.

(56) References Cited

U.S. PATENT DOCUMENTS

| | | | |
|---|---|---|---|
| 3,601,642 | A | 8/1971 | Willyoung |
| 6,459,187 | B1 | 10/2002 | Oohashi et al. |
| 2006/0226727 | A1 | 10/2006 | Bramson et al. |

(Continued)

FOREIGN PATENT DOCUMENTS

| | | |
|---|---|---|
| CN | 204231052 U | 3/2015 |
| CN | 206041669 U | 3/2017 |
| CN | 109120084 A | 1/2019 |

(Continued)

OTHER PUBLICATIONS

WO 2012086067 A1 English Translation (Year: 2012).*

*Primary Examiner* — Bryan R Perez

(74) *Attorney, Agent, or Firm* — Maier & Maier, PLLC

(57) ABSTRACT

A six-phase flat wire wave winding structure. Each phase of wave winding structure has a wire-in end, a wire-out end, and a wire located between the wire-out end and the wire-in end. The six-phase flat wire wave winding structure is applicable to a 2M-layer (M=1, 2, 3 . . . ) six-phase motor whose quantity of slots of each phase in each pole is q, whose quantity of stator slots is 6q (q=1, 2, 3 . . . ) times of a quantity of poles, and whose quantity a of parallel branches is 1 or 2. Each phase of the wave winding structure has conductors in all layers of a same stator slot, and the wave windings are uniformly and symmetrically distributed. In addition, problems that a flat wire winding process is highly difficult and manufacturing costs are high due to an increase in a quantity of phases of the six-phase motor are effectively resolved.

16 Claims, 16 Drawing Sheets

(56) References Cited

U.S. PATENT DOCUMENTS

2009/0134737 A1    5/2009  Maekawa et al.
2019/0285141 A1*   9/2019  Ohr ..................... B60K 17/145

FOREIGN PATENT DOCUMENTS

| CN | 111446797 | A  | 7/2020 | | |
|----|-----------|----|--------|---|---|
| CN | 111564921 | A  | 8/2020 | | |
| CN | 111917211 | A  | 11/2020 | | |
| CN | 212649211 | U  | 3/2021 | | |
| EP | 1109290   | A2 | 6/2001 | | |
| WO | WO-2012086067 | A1 * | 6/2012 | ............. | H02K 11/05 |

* cited by examiner

SIX-PHASE FLAT WIRE WAVE WINDING STRUCTURE, SIX-PHASE MOTOR, POWERTRAIN, AND VEHICLE

CROSS-REFERENCE TO RELATED APPLICATIONS

This application claims priority to Chinese Patent Application No. 202110528805.3, filed on May 14, 2021, which is hereby incorporated by reference in its entirety.

TECHNICAL FIELD

The embodiments relate to the field of motor winding technologies, a six-phase flat wire wave winding structure, a six-phase motor, a powertrain, and a vehicle.

BACKGROUND

In recent years, miniaturization and high speed have become the main development trend of a motor of a new energy electric vehicle. In comparison with a conventional permanent magnet motor, a winding of a flat wire motor has a characteristic of a high copper fill factor, and the high copper fill factor can greatly increase torque density and power density of the motor. A length of an end portion of the winding of the flat wire motor is relatively short, so that utilization of space of the vehicle can be further improved. A relatively large contact area between wires effectively enhances a heat dissipation capability of the motor. Therefore, the flat wire motor has a good application prospect in new energy electric vehicles.

In comparison with a three-phase motor, a six-phase motor can counteract specific-order harmonic, reduce torque ripple, and improve NVH performance of the motor. With an increase in a quantity of phases of the motor, a fault tolerance capability of the motor is enhanced and working reliability is higher.

In the conventional technology, a flat wire wave winding structure uses a connection manner of a short-pitch wave winding, phases of the winding exist in different layers of a stator slot, a wire-out end of each phase is set to a welding end, and a non-wire-out end is a U-shaped wire. However, with an increase in the quantity of phases of the motor, a winding process of the flat wire becomes more difficult. It is difficult to ensure that spans of U-shaped coils are consistent, manufacturing costs correspondingly increase, and multi-layer wiring in a same slot easily causes unbalance between in-phase branches, a loop current is generated, losses are increased, and efficiency of the motor is reduced.

SUMMARY

Embodiments provide a six-phase flat wire wave winding structure, a six-phase motor, a powertrain, and a vehicle. Each phase of wave winding has conductors in all layers of a same stator slot, and the wave windings are uniformly and symmetrically distributed. Potentials of branches are balanced, and there is no loop current. Conductors in different layers of a same slot are in-phase, and do not need to be isolated by insulating paper. This helps improve a slot fill factor and reduce costs. In addition, problems that a flat wire winding process is highly difficult and manufacturing costs are high due to an increase in a quantity of phases of the six-phase motor are effectively resolved.

An embodiment provides a six-phase flat wire wave winding structure, including a six-phase flat wire wave winding, where each phase of the wave winding includes a wire-in end, a wire-out end, and a wire located between the wire-out end and the wire-in end;

each phase of the wave winding includes a branch winding, and a quantity of stator slots in which each phase of the branch winding is wound is Pq, a total quantity of the stator slots is 6Pq, P is a quantity of poles of a motor, and q is a quantity of slots of each phase of the wave winding in each pole;

each of the stator slots has 2M layers of in-phase wave windings, and the wave windings in the stator slots have a same quantity of layers; the wire-in end and the wire-out end of each phase of the wave winding are both located at a bottom or an opening of the stator slot, and a and M are positive integers; and the six-phase flat wire wave winding includes two symmetrical three-phase wave windings, and a difference between electrical angles of the two three-phase wave windings is 30 degrees.

In the six-phase motor provided in this embodiment, an even number of layers of in-phase wave windings are wound in each stator slot. In this way, layers of the wave winding in a same stator slot are in-phase. Because insulating paper does not need to be disposed between the in-phase layers of the wave winding for isolation, the insulating paper is prevented from being disposed between the layers of the wave winding in a same stator slot, so that an available space in the stator slot increases. In this way, a cross-sectional area of the wave winding that can be accommodated in the stator slot increases, to further help increase a slot fill factor. In this way, a magnitude of a current flowing through the wave winding in the stator slot increases, to help increase an output torque of the motor. In addition, the insulating paper is prevented from being disposed in each stator slot, so that costs of the motor are reduced. In addition, each phase of the wave winding has conductors in all layers of a same stator slot, and the six-phase flat wire wave winding structure includes two symmetrical three-phase wave windings, phases of the wave winding are uniformly and symmetrically distributed, and potentials of branches are balanced. There is no loop current, and harmonic is counteracted. In addition, the layers of the wave winding in the same stator slot are in-phase, so that problems that a flat wire winding process is highly difficult and manufacturing costs are high due to an increase in the quantity of phases of the six-phase motor are effectively resolved.

In a possible implementation, each phase of the wave winding has 2M layers in the stator slot, and when the quantity q of the slots of each phase of the wave winding in each pole is 1, and a=1, a winding manner of any phase of the wave winding is:

$$X_1 - [X+6\times1]_2 - [X+6\times2]_1 - [X+6\times3]_2 \ldots - [X+6\times(P-1)]_2 -$$

$$X_3 - [X+6\times1]_4 - [X+6\times2]_3 - [X+6\times3]_4 \ldots - [X+6\times(P-1)]_4 -$$

$$\ldots$$

$$X_{2M-1} - [X+6\times1]_{2M} - [X+6\times2]_{2M-1} - [X+6\times3]_{2M} \ldots - [X+6\times(P-1)]_{2M} -$$

$$X_{2M} - [X+6\times(P-1)]_{2M-1} - [X+6\times(P-2)]_{2M} - [X+6\times(P-3)]_{2M-1} \ldots - [X+6\times1]_{2M-1} -$$

$$\ldots$$

$$X_4 - [X+6\times(P-1)]_3 - [X+6\times(P-2)]_4 - [X+6\times(P-3)]_3 \ldots - [X+6\times1]_3 -$$

$$X_2 - [X+6\times(P-1)]_1 - [X+6\times(P-2)]_2 - [X+6\times(P-3)]_1 \ldots - [X+6\times1]_1$$

$X_{2M}$ represents a (2M)th layer of an Xth slot, $X_{2M-1}$ represents a (2M−1)th layer of the Xth slot, X represents the Xth slot in the stator slots, and X is less than 7.

In a possible implementation, each phase of the wave winding has one jumper, and two ends of the jumper are respectively connected to a (2M)th layer of an [X+6×(P−1)]th slot and the (2M)th layer of the Xth slot.

In a possible implementation, a span of the jumper of each phase of the wave winding is y; and y is 6q; and spans between welding ends and non-welding ends of coils of phases of the wave winding are equal and are all y.

In a possible implementation, each phase of the wave winding has 2M layers in the stator slot, and when the quantity q of the slots of each phase of the wave winding in each pole is 2, and a=1, a winding manner of any phase of the wave winding is:

$X_1$−[X+12×1]$_2$−[X+12×2]$_1$−[X+12×3]$_2$ . . . −[X+12×(P−1)]$_2$−

$X_3$−[X+12×1]$_4$−[X+12×2]$_3$−[X+12×3]$_4$ . . . −[X+12×(P−1)]$_4$−

. . .

$X_{2M-1}$−[X+12×1]$_{2M}$−[X+12×2]$_{2M-1}$−[X+12×3]$_{2M}$ . . . −[X+12×(P−1)]$_{2M}$−

$X_{2M}$−[X+12×(P−1)]$_{2M-1}$−[X+12×(P−2)]$_{2M}$−[X+12×(P−3)]$_{2M-1}$ . . . −[X+12×1]$_{2M-1}$−

. . .

$X_4$−[X+12×(P−1)]$_3$−[X+12×(P−2)]$_4$−[X+12×(P−3)]$_3$ . . . −[X+12×1]$_3$−

$X_2$−[X+12×(P−1)]$_1$−[X+12×(P−2)]$_2$−[X+12×(P−3)]$_1$ . . . −[X+12×1]$_1$−

[X+1]$_1$−[X+1+12×1]$_2$−[X+1+12×2]$_1$−[X+1+12×3]$_2$ . . . −[X+1+12×(P−1)]$_2$−

[X+1]$_3$−[X+1+12×1]$_4$−[X+1+12×2]$_3$−[X+1+12×3]$_4$ . . . −[X+1+12×(P−1)]$_4$−

. . .

[X+1]$_{2M-1}$−[X+1+12×1]$_{2M}$−[X+1+12×2]$_{2M-1}$−[X+1+12×3]$_{2M}$ . . . −[X+1+12×(P−1)]$_{2M}$−

[X+1]$_{2M}$−[X+1+12×(P−1)]$_{2M-1}$−[X+1+12×(P−2)]$_{2M}$−[X+1+12×(P−3)]$_{2M-1}$ . . . −[X+1+12]$_{2M-1}$−

. . .

[X+1]$_4$−[X+1+12×(P−1)]$_3$−[X+1+12×(P−2)]$_4$−[X+1+12×(P−3)]$_3$ . . . −[X+1+12]$_3$−

[X+1]$_2$−[X+1+12×(P−1)]$_1$−[X+1+12×(P−2)]$_2$−[X+1+12×(P−3)]$_1$ . . . −[X+1+12]$_1$ $X_{2M}$ represents a (2M)th layer of an Xth slot, $X_{2M-1}$ represents a (2M−1)th layer of the Xth slot, [X+1]$_{2M}$ represents a (2M)th layer of an (X+1)th slot, X represents the Xth slot in the stator slots, and X is less than 13.

In a possible implementation, each phase of the wave winding has a first jumper, a second jumper, and a third jumper;

two ends of the first jumper are respectively connected to a (2M)th layer of an [X+12×(P−1)]th slot and the (2M)th layer of the Xth slot;

two ends of the second jumper are respectively connected to the first layer of an (X+12)th slot and the first layer of the (X+1)th slot; and two ends of the third jumper are respectively connected to a (2M)th layer of an [X+1+12×(P−1)]th slot and the (2M)th layer of the (X+1)th slot.

In a possible implementation, a span of the first jumper is y, a span of the second jumper is y−1, and a span of the third jumper is y; and spans between welding ends and non-welding ends of coils of phases of the wave winding are equal and are all y, and y is 6q.

In a possible implementation, each phase of the wave winding is wound in one of the stator slots in each pole to form a first coil, and each phase of the wave winding is wound in another one of the stator slots in each pole to form a second coil, and the first coil is connected in series to the second coil by using the second jumper; and a difference between phases of the first coil and the second coil is 30/q degrees.

In a possible implementation, each phase of the wave winding includes a first branch winding and a second branch winding that are connected in parallel, and a winding manner of the second branch winding and a winding manner of the first branch winding are kept consistent and the second branch winding performs overall translation by one of the stator slots; and each of the stator slots has the first branch winding and the second branch winding that are in-phase and that have a same quantity of layers, and the first branch winding and the second branch winding are alternately arranged in the same stator slot.

In a possible implementation, when each phase of the wave winding has 2M layers in the stator slot, and when the quantity q of the slots of each phase of the wave winding in each pole is 2, and a=2, a winding manner of a first branch winding in any phase of the wave winding is:

$X_1$−[X+12×1]$_2$−[X+12×2]$_1$−[X+12×3]$_2$ . . . −[+12×(P−1)]$_2$−

$X_3$−[X+12×1]$_4$−[X+12×2]$_3$−[X+12×3]$_4$ . . . −[X+12×(P−1)]$_4$−

. . .

$X_{2M-1}$−[X+12×1]$_{2M}$−[X+12×2]$_{2M-1}$−[X+12×3]$_{2M}$ . . . −[X+12×(P−1)]$_{2M}$−

[X+1]$_{2M}$−[X+1+12×(P−1)]$_{2M-1}$−[X+1+12×(P−2)]$_{2M}$−[X+1+12×(P−3)]$_{2M-1}$ . . . −[X+1+12]$_{2M-1}$−

. . .

[X+1]$_4$−[X+1+12×(P−1)]$_3$−[X+1+12×(P−2)]$_4$−[X+1+12×(P−3)]$_3$ . . . −[X+1+12]$_3$−

[X+1]$_2$−[X+1+12×(P−1)]$_1$−[X+1+12×(P−2)]$_2$−[X+1+12×(P−3)]$_1$ . . . −[X+1+12]$_1$ $X_{2M-1}$ represents a (2M−1)th layer of an Xth slot, [X+1]$_{2M}$ represents a (2M)th layer of an (X+1)th slot, X represents the Xth slot in the stator slots, and X is less than 13.

In a possible implementation, when each phase of the wave winding has 2M layers in the stator slot, and when the quantity q of the slots of each phase of the wave winding in each pole is 2, and a=2, a winding manner of a second branch winding in any phase of the wave winding is:

$$[X+1]_1-[X+1+12\times1]_2-[X+1+12\times2]_1-$$
$$[X+1+12\times3]_2\ldots-[X+1+12\times(P-1)]_2-$$

$$[X+1]_3-[X+1+12\times1]_4-[X+1+12\times2]_3-$$
$$[X+1+12\times3]_4\ldots-[X+1+12\times(P-1)]_4-$$

$$\ldots$$

$$[X+1]_{2M-1}-[X+1+12\times1]_{2M}-[X+12\times2]_{2M-1}-$$
$$[X+12\times3]_{2M}\ldots-[X+12\times(P-1)]_{2M}-$$

$$[X]_{2M}-[X+12\times(P-1)]_{2M-1}-[X+12\times(P-2)]_{2M}-[X+12\times(P-3)]_{2M-1}\ldots-[X+12]_{2M-1}-$$

$$\ldots$$

$$[X]_4-[X+12\times(P-1)]_3-[X+12\times(P-2)]_4-$$
$$[X+12\times(P-3)]_3\ldots-[X+12]_3-$$

$$[X]_2-[X+12\times(P-1)]_1-[X+12\times(P-2)]_2-$$
$$[X+12\times(P-3)]_1\ldots-[X+12]_1.$$

In a possible implementation, the first branch winding of each phase of the wave winding has a fourth jumper, and two ends of the fourth jumper are respectively connected to a (2M)th layer of an [X+12×(P−1)]th slot and the (2M)th layer of the (X+1)th slot; and the second branch winding of each phase of the wave winding has a fifth jumper, and two ends of the fifth jumper are respectively connected to a (2M)th layer of an [X+1+12×(P−1)]th slot and an (2M)th layer of the Xth slot.

In a possible implementation, a span of the fourth jumper is y+1, and a span of the fifth jumper is y−1; and spans between welding ends and non-welding ends of coils of phases of the wave winding are equal and are all y, and y is 6q.

In a possible implementation, the first branch winding of each phase of the wave winding is separately wound in two of the stator slots in each pole to form a third coil and a fourth coil, and the third coil is connected in series to the fourth coil by using the fourth jumper; and a difference between phases of the third coil and the fourth coil is 30/q degrees.

In a possible implementation, the second branch winding of each phase of the wave winding is separately wound in two of the stator slots in each pole to form a fifth coil and a sixth coil, and the fifth coil is connected in series to the sixth coil by using the fifth jumper; and a difference between phases of the fifth coil and the sixth coil is 30/q degrees.

An embodiment further provides a six-phase motor, including at least a stator iron core and the foregoing six-phase flat wire wave winding structure, and a plurality of stator slots are disposed in an inner wall of the stator iron core in a peripheral direction;

a part of a six-phase flat wire wave winding in the six-phase flat wire wave winding structure is wound in the stator slots, and a part of the six-phase flat wire wave winding is located outside the stator slots; and each of the stator slots has 2M layers of in-phase wave windings, and the wave windings in the stator slots have a same quantity of layers, and M is positive integer.

An embodiment further provides a powertrain, including at least a speed reducer and the foregoing six-phase motor, where the motor is connected to the speed reducer by using a rotating shaft.

An embodiment further provides a vehicle, including at least the foregoing six-phase motor or the foregoing powertrain.

The foregoing six-phase motor or powertrain is included, and an even number of layers of in-phase wave windings are wound in each stator slot in the six-phase motor. In this way, layers of the wave winding in a same stator slot are in-phase. Because insulating paper does not need to be disposed between the in-phase layers of the wave winding for isolation, the insulating paper is prevented from being disposed between the layers of the wave winding in a same stator slot, so that an available space in the stator slot increases. In this way, a cross-sectional area of the wave winding that can be accommodated in the stator slot increases, to further help increase a slot fill factor. In this way, a magnitude of a current flowing through the wave winding in the stator slot increases, to help increase an output torque of the motor, so that the powertrain is applicable to a plurality of vehicles with different torque requirements. In addition, the insulating paper is prevented from being disposed in each stator slot, so that costs of the motor are reduced. In addition, each phase of the wave winding has conductors in all layers of a same stator slot, and the six-phase flat wire wave winding structure includes two symmetrical three-phase wave windings, phases of the wave winding are uniformly and symmetrically distributed, and potentials of branches are balanced. There is no loop current, and harmonic is counteracted, so that performance of the powertrain is better. In addition, the layers of the wave winding in the same stator slot are in-phase, so that problems that a flat wire winding process is highly difficult and manufacturing costs are high due to an increase in the quantity of phases of the six-phase motor are effectively resolved, thereby reducing the manufacturing costs of the vehicle.

DETAILED DESCRIPTION OF THE EMBODIMENTS

Figure 1:
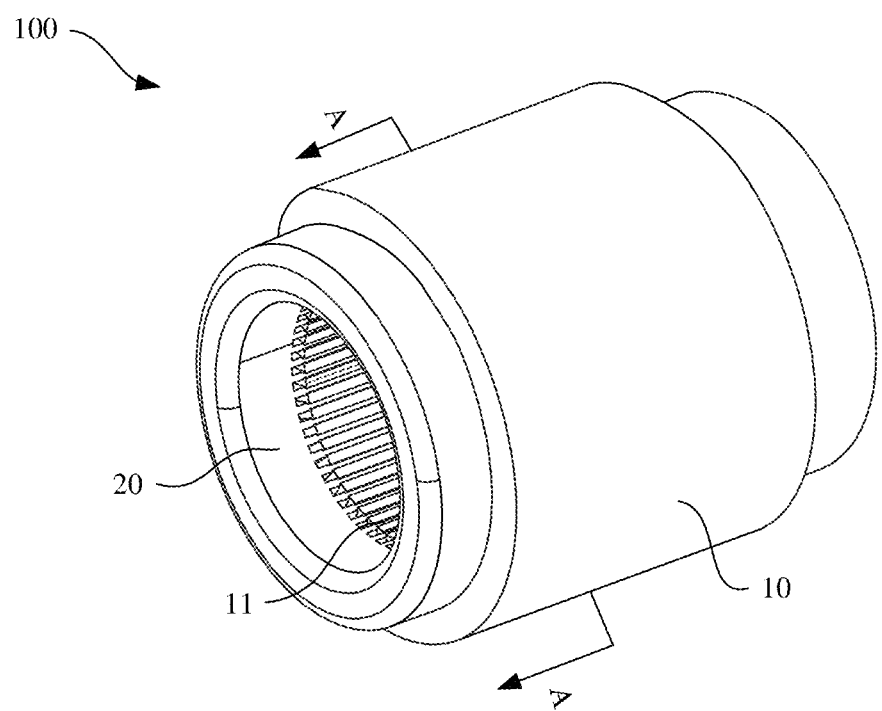
FIG. 1 is a schematic diagram of a three-dimensional structure of a six-phase motor according to an embodiment.

Terms used in implementations are merely intended to explain embodiments, but are not intended as limiting.

First, some terms in motors are explained:

A quantity of poles of a motor is a quantity of magnetic poles of the motor. The magnetic poles are divided into N poles and S poles. Generally, one N pole and one S pole are referred to as a pair of magnetic poles, that is, a quantity of pole pairs is 1. Therefore, if the quantity of pole pairs of the motor is 1, 2, 3, or 4, a quantity (P) of poles of the motor is 2, 4, 6, or 8. A rotational speed (n) of the motor and the quantity of pole pairs of the motor satisfy n=60f/p, where f is a frequency of a power supply. For example, when f=50 Hz and the quantity of poles of the motor is 2, the rotational speed n of the motor is 3000 r/minute. If the quantity of poles of the motor is 4, the rotational speed n of the motor is 1500 r/minute. If the quantity of poles of the motor is 6, the rotational speed n of the motor is 1000 r/minute. If the quantity of poles of the motor is 8, the rotational speed n of the motor is 750 r/minute. When the frequency f is changed, the rotational speed of the motor is related to the frequency and the quantity of pole pairs.

A pitch (y) is a quantity of slots that span between two adjacent effective edges of a coil. The pitch is also referred to as a span, and a value of the pitch is represented by a quantity of slots. It should be noted that the effective edge is also referred to as an element edge, and refers to a part of a wave winding that is located in a stator slot, and the part can cut a magnetic field and sense electrodynamic force in the stator slot. For example, when a quantity of slots spanned between two adjacent effective edges of a phase of wave winding (for example, a U-phase wave winding) is 6, the pitch is 6. When a quantity of slots spanned between two adjacent effective edges of a phase of wave winding (for example, a U-phase wave winding) is 12, the pitch is 12.

A slot fill factor is a ratio of a cross section of a conductor in a stator slot to an effective area of the stator slot.

In the conventional technology, when the motor uses a flat wire wave winding structure, adjacent conductors (namely, copper wires) of different layers in a same slot have different phases. Therefore, insulating paper needs to be disposed between the adjacent conductors of different layers in the same slot. The insulating paper is wound in space in the slot. Consequently, a cross section of a conductor that can be accommodated in the slot is reduced, and the slot fill factor is reduced. As a result, a magnitude of a current flowing through the conductor in the slot is reduced, and an output torque of the motor is affected. In addition, because the insulating paper is disposed, costs are increased.

A six-phase motor 100 may be a six-phase flat wire wave winding motor. The motor may be applied to an electric vehicle/electric automobile (EV), a Pure Electric Vehicle/Battery Electric Vehicle (PEV/BEV), a hybrid electric vehicle (HEV), a range extended electric vehicle (REEV), a plug-in hybrid electric vehicle (PHEV), a new energy vehicle, battery management, a motor & driver, a power converter, a reducer, and the like.

In the six-phase flat wire wave winding structure and the six-phase motor 100 provided in the embodiments, an even number of layers of an in-phase wave winding are wound in each stator slot. In this way, layers of the wave winding in a same stator slot are in-phase. Because insulating paper does not need to be disposed between the in-phase layers of the wave winding for isolation, the insulating paper is prevented from being disposed between the layers of the wave winding in a same stator slot, so that an available space in the stator slot increases. In this way, a cross-sectional area of the wave winding that can be accommodated in the stator slot increases, to further help increase a slot fill factor. In this way, a magnitude of a current flowing through the wave winding in the stator slot increases, to help increase an output torque of the motor. In addition, the insulating paper is prevented from being disposed in each stator slot, so that costs of the motor are reduced.

FIG. 1 shows the six-phase motor 100 according to an embodiment. As shown in FIG. 1, the six-phase motor 100 includes at least: the six-phase flat wire wave winding structure and a stator iron core 10. A plurality of stator slots 11 are disposed in an inner wall of the stator iron core 10 in a circumferential direction. Two ends of the stator slot 11 separately extend along an axial direction of the stator iron core 10 to two end surfaces of the stator iron core 10.

Figure 2:
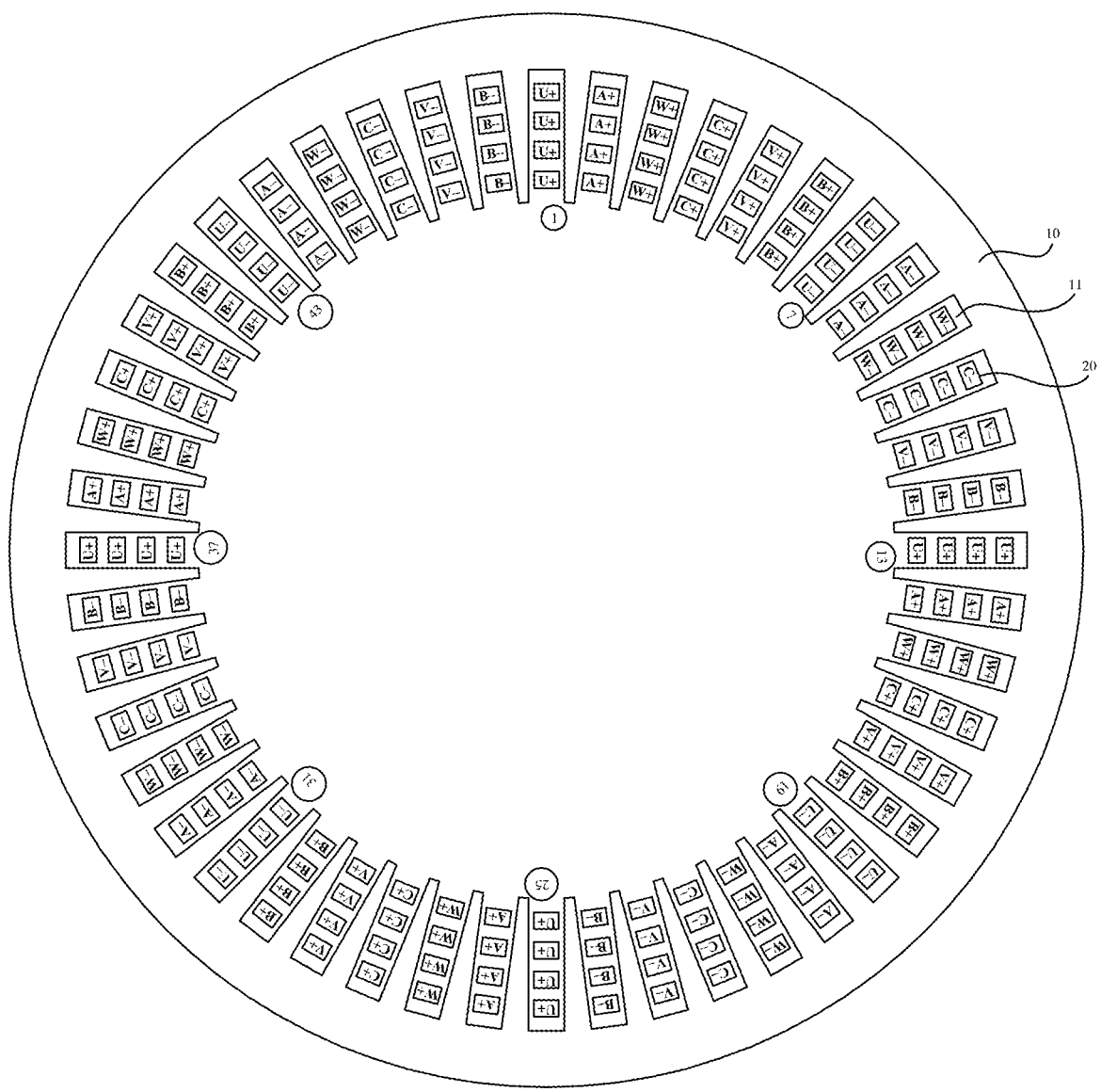
FIG. 2 is a schematic diagram of a cross-sectional structure of a six-phase motor along an A-A direction in FIG. 1 according to an embodiment.
Figure 3:
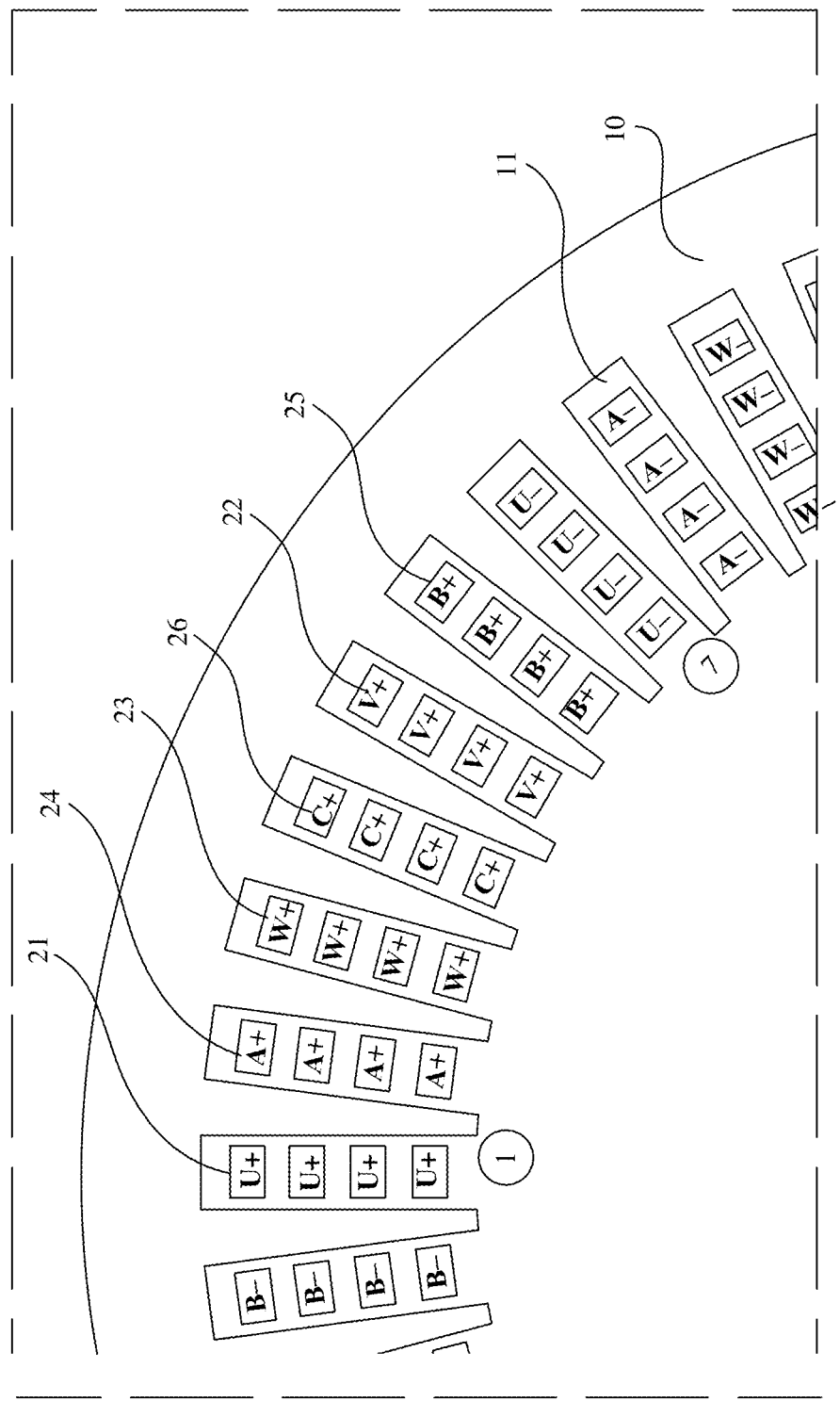
FIG. 3 is a schematic diagram of an enlarged part in FIG. 2.

FIG. 2 is a schematic diagram of a cross section of the six-phase motor 100. FIG. 3 is a schematic diagram of an enlarged part in FIG. 2. As shown in FIG. 2 and FIG. 3, the six-phase flat wire wave winding structure includes a six-phase flat wire wave winding 20, and the six-phase flat wire wave winding 20 includes a U-phase wave winding 21, a V-phase wave winding 22, a W-phase wave winding 23, an A-phase wave winding 24, a B-phase wave winding 25, and a C-phase wave winding 26.

In this embodiment, the six-phase flat wire wave winding 20 includes two symmetrical three-phase wave windings. For example, the U-phase wave winding 21, the V-phase wave winding 22, and the W-phase wave winding 23 may be one three-phase wave winding. The A-phase wave winding 24, the B-phase wave winding 25, and the C-phase wave winding 26 may be the other three-phase wave winding. In addition, the two three-phase wave windings are disposed symmetrically, and a difference between electrical angles of the two three-phase wave windings is 30 degrees. Phases of the two three-phase wave windings may be different. Some existing six-phase motors 100 include two three-phase wave windings that have same phases and that are connected in parallel or in series. However, a motor with this structure is essentially a dual three-phase winding motor, rather than a six-phase winding motor, and harmonic cannot be counteracted. However, the six-phase motor 100 provided in this embodiment includes two three-phase wave windings with different phases, and harmonic can be counteracted.

Figure 4:
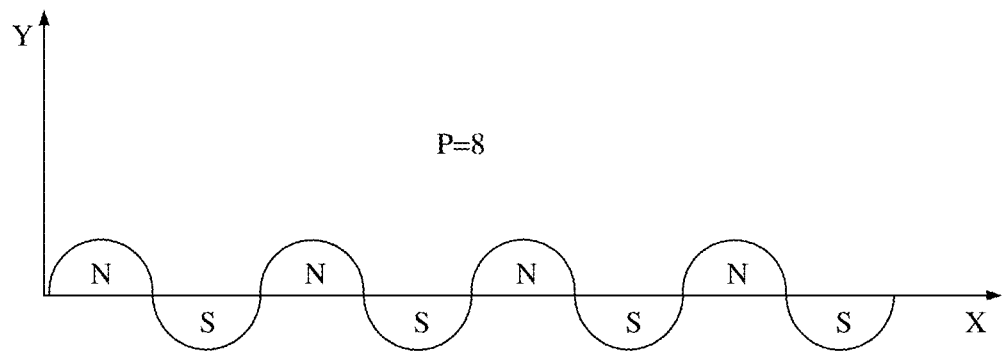
FIG. 4 is a schematic diagram of magnetic poles when there are eight magnetic poles in a six-phase motor according to an embodiment.

As shown in FIG. 4, the six-phase motor 100 in FIG. 2 in this embodiment is described by using an 8-pole motor as an example. That is, the six-phase motor 100 shown in FIG. 2 has eight poles and four pole pairs, and each pole pair includes an N pole and an S pole. Therefore, as shown in FIG. 2 and FIG. 3, the six-phase flat wire wave winding 20 in each pole is sequentially wound in the stator slot 11.

It should be noted that, in FIG. 3, "+" represents current inflow into a conductor, and "−" represents current outflow from a conductor.

In this embodiment, each stator slot 11 has 2M layers of an in-phase wave winding, and the wave windings in the stator slots 11 have a same quantity of layers. For example, as shown in FIG. 2 and FIG. 3, M=2, and each stator slot 11 has four layers of in-phase wave windings, and each of the stator slots 11 has four layers of the wave winding. M is a positive integer, for example, M=1, 2, 3, or 4. Each stator slot 11 may have an even number of layers.

Figure 5:
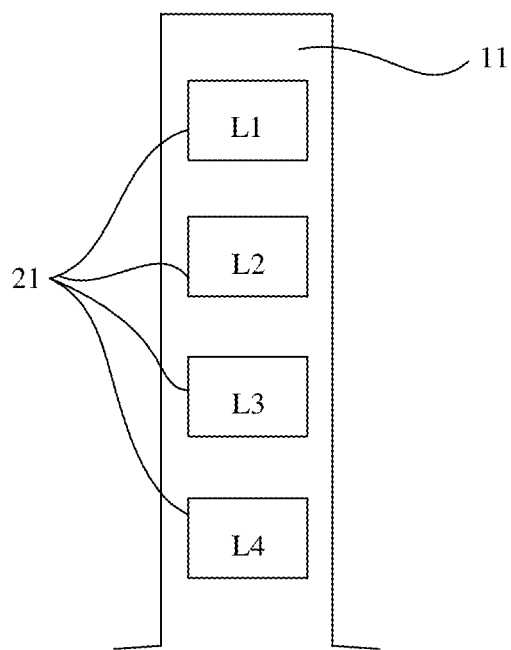
FIG. 5 is a schematic diagram of a U-phase wave winding in one of stator slots in a six-phase motor according to an embodiment.

As shown in FIG. 5, one of the stator slots 11 has four layers of a U-phase wave winding 21. The four layers of the U-phase wave winding 21 are respectively an L1 layer, an L2 layer, an L3 layer, and an L4 layer, and the wave winding in the L1 layer, the L2 layer, the L3 layer, and the L4 layer is the U-phase wave winding 21. Therefore, as shown in FIG. 5, an insulation layer does not need to be disposed between two adjacent layers of the wave winding in the same stator slot 11.

Therefore, in the six-phase motor 100 provided in this embodiment, an even number of layers of in-phase wave windings are wound in each stator slot 11. In this way, layers of the wave winding in a same stator slot 11 are in-phase. Because insulating paper does not need to be disposed between the in-phase layers of the wave winding for isolation, the insulating paper is prevented from being disposed between the layers of the wave winding in a same stator slot 11, so that an available space in the stator slot 11 increases. In this way, a cross-sectional area of the wave winding that can be accommodated in the stator slot 11 increases, to further help increase a slot fill factor. In this way, a magnitude of a current flowing through the wave winding in the stator slot 11 increases, to help increase an output torque of the motor. In addition, the insulating paper is prevented from being disposed in each stator slot 11, so that costs of the motor are reduced.

Figure 6:
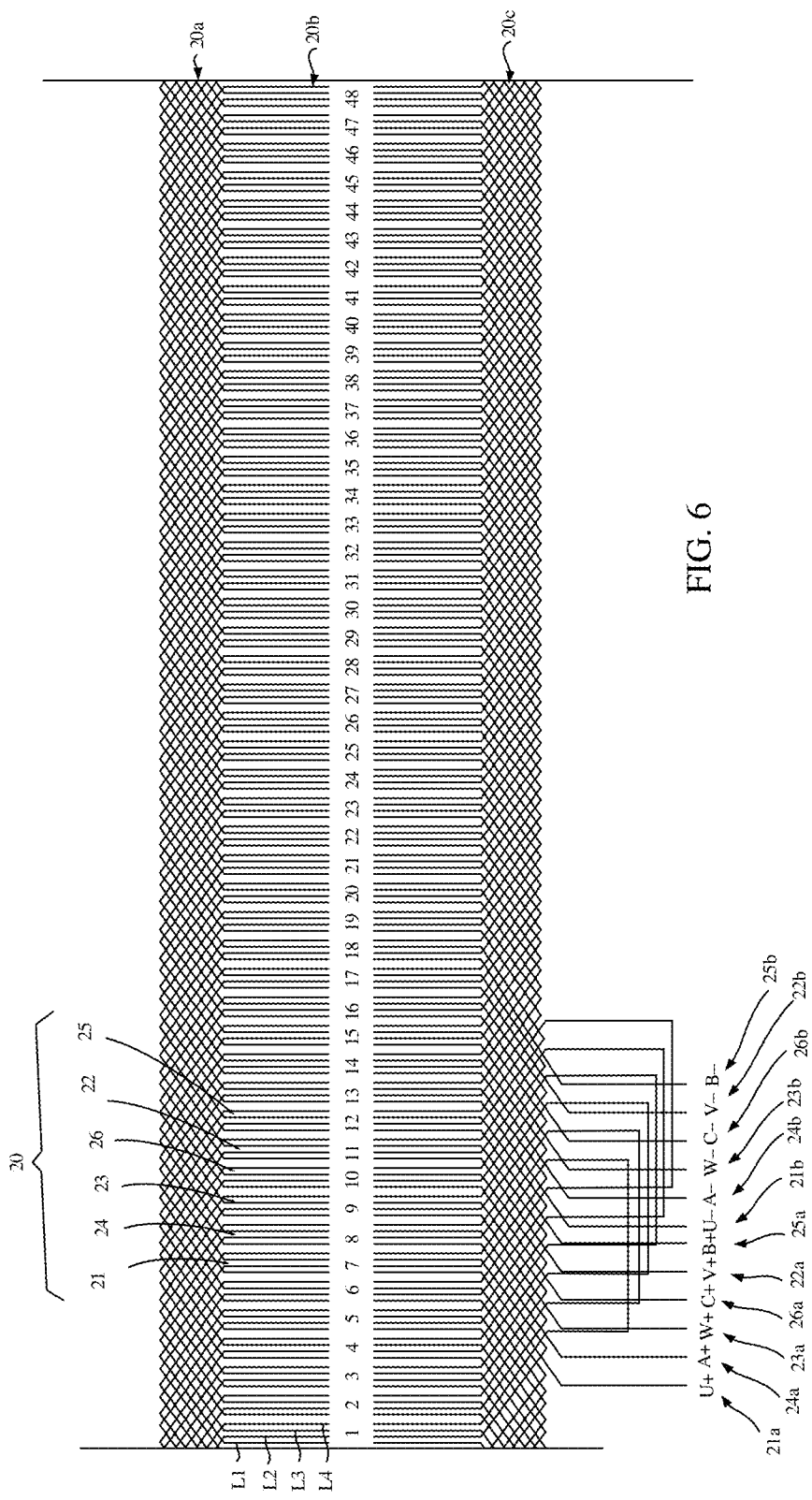
FIG. 6 is a schematic diagram of an unfolded six-phase flat wire wave winding when q=1 and a=1 in a six-phase motor according to an embodiment.

Each phase of wave winding has a wire-in end and a wire-out end. For example, as shown in FIG. 6, the U-phase wave winding 21 has a wire-in end 21a (namely, U+) and a wire-out end 21b (namely, U−); the V-phase wave winding 22 has a wire-in end 22a (namely, V+) and a wire-out end 22b (namely, V−); the W-phase wave winding 23 has a wire-in end 23a (namely, W+) and a wire-out end 23b (namely, W−); the A-phase wave winding 24 has a wire-in end 24a (namely, A+) and a wire-out end 24b (namely, A−); the B-phase wave winding 25 has a wire-in end 25a (namely, B+) and a wire-out end 25b (namely, B−); and the C-phase wave winding 26 has a wire-in end 26a (namely, C+) and a wire-out end 26b (namely, C−).

There is a wire between the wire-in end and the wire-out end of each phase of wave winding. The wire of each phase of wave winding forms an effective edge 20b and two end portions of the six-phase flat wire wave winding 20. As shown in FIG. 6, the six-phase flat wire wave winding 20 includes the effective edge 20b and the two end portions. The two end portions are respectively a first end portion 20a and a second end portion 20c. The effective edge 20b is located in the stator slot 11. The first end portion 20a and the second end portion 20c are located outside the stator slot 11 and are respectively located on two ends of the effective edge 20b.

Figure 7:
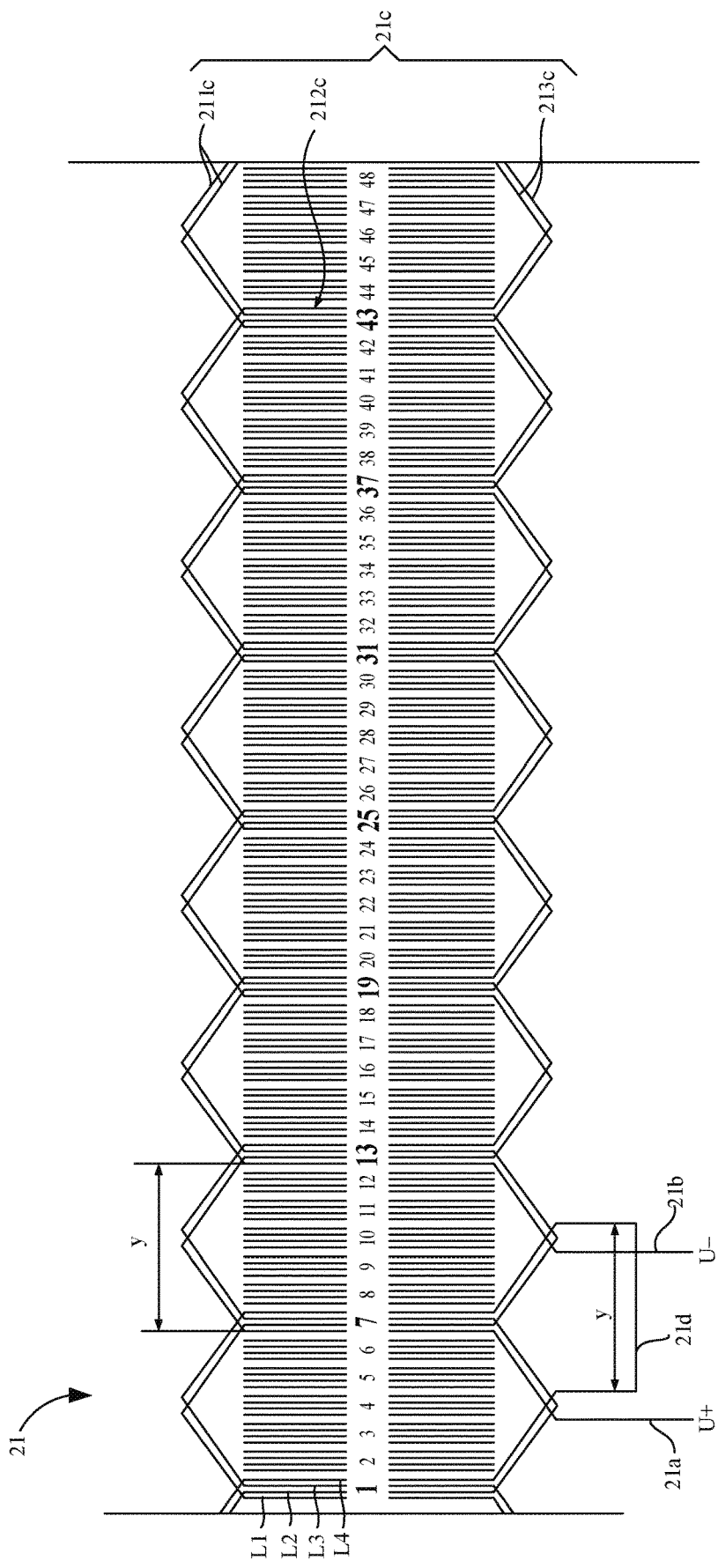
FIG. 7 is a schematic diagram of unfolded winding of a U-phase wave winding when q=1 and a=1 in a six-phase motor according to an embodiment.

For example, as shown in FIG. 7, there is a U-phase wire 21c between the wire-in end 21a and the wire-out end 21b of the U-phase wave winding 21. The U-phase wire 21c includes a U-phase effective edge 212c and two U-phase end portions. The two U-phase end portions are respectively a first U-phase end portion 211c and a second U-phase end portion 213c. The U-phase effective edge 212c is located in each stator slot 11 corresponding to the U-phase wave winding 21. The first U-phase end portion 211c and the second U-phase end portion 213c are respectively located on two ends of the U-phase effective edge 212c.

In this embodiment, the wire-in end and the wire-out end of each phase of wave winding are both located at a bottom of the stator slot 11. For example, the wave winding in the L1 layer in the stator slot 11 is located at the bottom of the stator slot 11 (as shown in FIG. 5). Therefore, the wire-in end of the wave winding is led in from the L1 layer in one of the stator slots 11, and the wire-out end of the wave winding is led out from the L1 layer of another stator slot 11.

Alternatively, the wire-in end and the wire-out end of each phase of wave winding are both located at an opening of the stator slot 11. For example, the wave winding in the L4 layer in the stator slot 11 is located at the opening of the stator slot 11 (as shown in FIG. 5). Therefore, the wire-in end of the wave winding is led in from the L4 layer in one of the stator slots 11, and the wire-out end of the wave winding is led out from the L4 layer of another stator slot 11.

For example, as shown in FIG. 7, the wire-in end 21a of the U-phase wave winding 21 is led in from the L1 layer of the seventh stator slot 11, and the wire-out end 21b of the U-phase wave winding 21 is led out from the L1 layer of the $13^{th}$ stator slot 11. The wire-in end 21a and the wire-out end 21b of the U-phase wave winding 21 are both located at the bottom of the stator slot 11.

The wire-in end and the wire-out end of each phase of wave winding are both located at the opening or the bottom of the stator slot 11, to facilitate connection of an end portion of a led-out wire.

In a possible implementation, each phase of wave winding includes a branch winding. For example, each phase of wave winding may include one branch winding, or each phase of wave winding may include two or more branch windings. In this embodiment, when each phase of wave winding includes two or more branch windings, the two or more branch windings in each phase of branch winding are connected in parallel.

Each phase of branch winding is wound in Pq stator slots 11. Therefore, for the six-phase flat wire wave winding, a total quantity of the stator slots 11 is 6Pq. P is a quantity of poles of the motor. A value of P may be selected based on an actual requirement. For example, P may be 8, 6, or 4. Q is a quantity of slots of each phase of wave winding in each pole, and q and a may be positive integers such as 1, 2, or 3.

Figure 8:
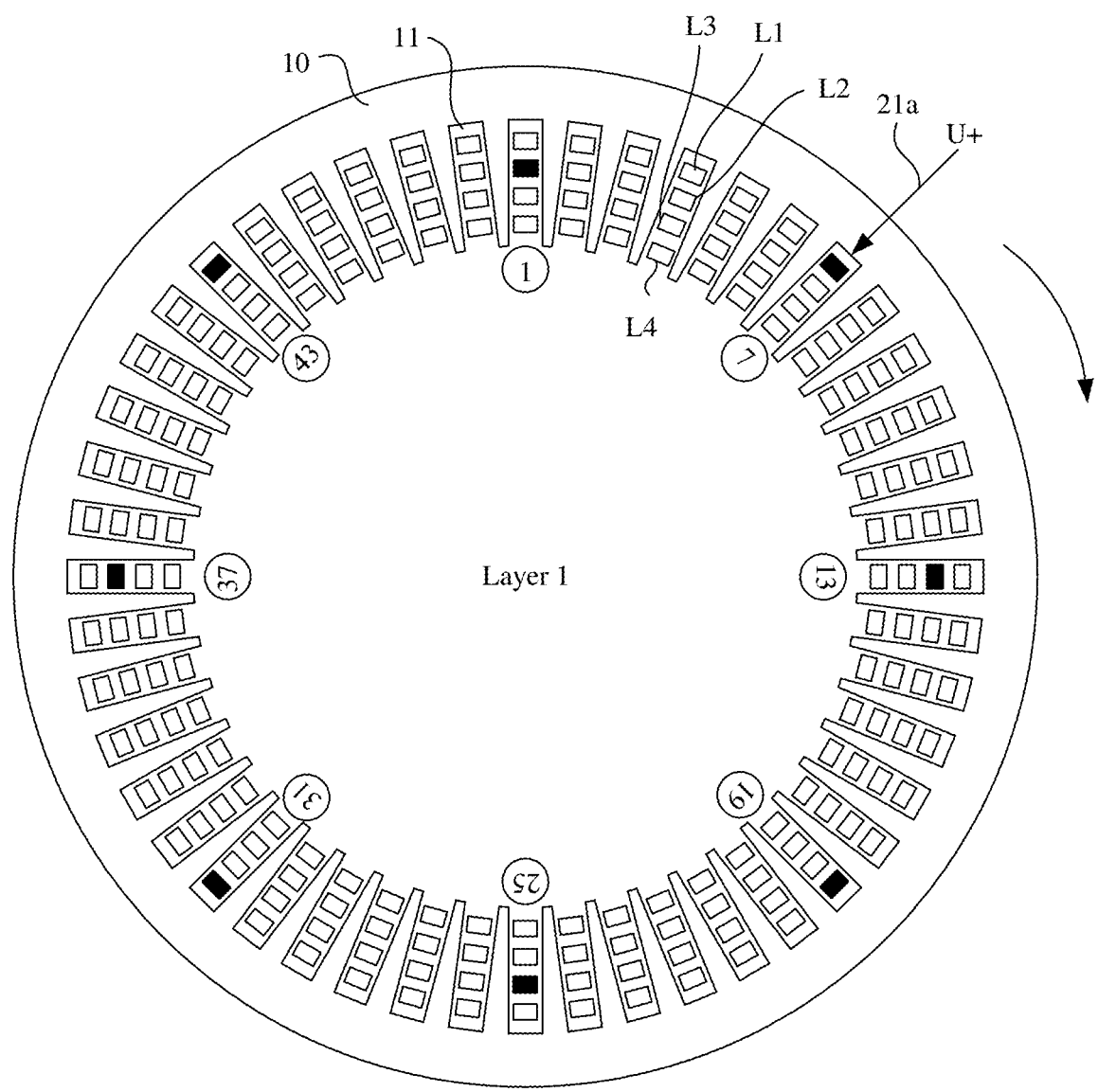
FIG. 8 is a schematic diagram of a cross section when a U-phase wave winding is wound in one layer in a stator slot in a six-phase motor according to an embodiment.

For example, as shown in FIG. 8, P=8 and q=1, then each phase of branch winding is wound in eight stator slots 11, and the total quantity of the stator slots 11 is 48. To facilitate winding, the 48 stator slots 11 are separately numbered. As shown in FIG. 7, the 48 stator slots 11 are numbered by using numbers 1 to 48.

As shown in FIG. 7, the U-phase wave winding 21 includes one branch winding, that is, a=1. The eight stator slots 11 in which the U-phase wave winding 21 is wound are respectively the first slot, the seventh slot, the $13^{th}$ slot, the $19^{th}$ slot, the $25^{th}$ slot, the $31^{st}$ slot, the $37^{th}$ slot, and the $43^{rd}$ slot. The wire-in end 21a of the U-phase wave winding 21 is led in from the L1 layer of the seventh slot, and after winding in four layers in the foregoing eight slots, the wire-out end 21b of the U-phase wave winding 21 is led out from the L1 layer of the $13^{th}$ slot.

The following separately describes a winding manner of the six-phase flat wire wave winding structure in the six-phase motor 100 by using different embodiments as examples.

Embodiment 1

In this embodiment, for example, the six-phase motor 100 is an eight-pole motor (that is, a quantity P of poles of the motor is 8), and a quantity q of slots of each phase in each pole is 1, that is, in each magnetic pole, each phase of wave winding is wound in one stator slot 11. In this embodiment, each phase of wave winding includes one branch winding, that is, a=1, and there is one parallel branch in each phase. Therefore, a quantity of the stator slots 11 is 6*8, namely, 48. The 48 stator slots 11 are respectively represented by S1 to S48 in Table 1, or represented by numbers 1 to 48 in FIG. 6.

A quantity of layers of each phase of wave winding in the stator slot 11 is 2M. In this embodiment, for example, starting from an Xth (X<7) slot, $X_i$ is defined as an ith layer of an Xth slot, and a winding manner of any phase of wave winding is:

$$X_1-[X+6\times1]_2-[X+6\times2]_1-[X+6\times3]_2 \ldots - [X+6\times(P-1)]_2-$$

$$X_3-[X+6\times1]_4-[X+6\times2]_3-[X+6\times3]_4 \ldots - [X+6\times(P-1)]_4-$$

$$\ldots$$

$$X_{2M-1}-[X+6\times1]_{2M-1}-[X+6\times2]_{2M-1}- [X+6\times3]_{2M} \ldots -[X+6\times(P-1)]_{2M}-$$

$$X_{2M-1}-[X+6\times(P-1)]_{2M-1}-[X+6\times(P-2)]_{2M-1}- [X+6\times(P-3)]_{2M-1} \ldots -[X+6\times1]_{2M-1}-$$

$$\ldots$$

$$X_4-[X+6\times(P-1)]_3-[X+6\times(P-2)]_4- [X+6\times(P-3)]_3 \ldots -[X+6\times1]_3-$$

$$X_2-[X+6\times(P-1)]_1-[X+6\times(P-2)]_2- [X+6\times(P-3)]_1 \ldots -[X+6\times1]_1$$

When each phase of wave winding in each pole is wound in 2M layers in a same stator slot 11, the wave winding may be first wound in odd-numbered layers in the same stator slot 11, and then wound in even-numbered layers in the same stator slot, and quantities of layers in which each phase of wave winding is wound in stator slots of two adjacent poles are different. For example, after winding is performed in the L1 layer in the Xth slot, winding is performed in the L2 layer in an (X+6)th slot, and then winding is performed in the L1 layer in an (X+12)th slot.

In this embodiment, M=2 is used as an example. Each stator slot 11 has four layers of the wave winding. The L1 layer of the wave winding is located at the bottom of the stator slot 11, the L4 layer is close to the opening of the stator slot 11, the L1 layer is the first layer, L2 is the second layer, L3 is the third layer, and L4 is the fourth layer. The six-phase flat wire wave winding 20 includes the U-phase wave winding, the V-phase wave winding, the W-phase wave winding, the A-phase wave winding, the B-phase wave winding, and the C-phase wave winding, where"+" in Table 1 represents current inflow into a conductor, and "−" represents current outflow from a conductor.

In this embodiment, for example, starting from the Xth (X<7) slot, a winding manner of any phase of wave winding is:

$$X_1-[X+6\times1]_2-[X+6\times2]_1-[X+6\times3]_2 \ldots - [X+6\times(P-1)]_2-$$

$$X_3-[X+6\times1]_4-[X+6\times2]_3-[X+6\times3]_4 \ldots - [X+6\times(P-1)]_4-$$

$$X_4-[X+6\times(P-1)]_3-[X+6\times(P-2)]_4- [X+6\times(P-3)]_3 \ldots -[X+6\times1]_3-$$

$$X_2-[X+6\times(P-1)]_1-[X+6\times(P-2)]_2- [X+6\times(P-3)]_1 \ldots -[X+6\times1]_1$$

When any phase of wave winding is first wound in one layer in corresponding P slots, winding may be:

$$X_1-[X+6\times1]_2-[X+6\times2]_1-[X+6\times3]_2 \ldots -[X+6\times(P-1)]_2$$

Next, when any phase of wave winding is wound in another layer in the corresponding P slots, winding may be:

$$X_3-[X+6\times1]_4-[X+6\times2]_3-[X+6\times3]_4 \ldots -[X+6\times(P-1)]_4$$

Then, when any phase of wave winding continues to be wound in one layer in the corresponding P slots, winding may be:

$$X_4-[X+6\times(P-1)]_3-[X+6\times(P-2)]_4- [X+6\times(P-3)]_3 \ldots -[X+6\times1]_3$$

Finally, when any phase of wave winding is wound in the last layer in the corresponding P slots, winding may be:

$$X_2-[X+6\times(P-1)]_1-[X+6\times(P-2)]_2- [X+6\times(P-3)]_1 \ldots -[X+6\times1]_1$$

In this way, by performing the foregoing winding for four times, any phase of wave winding completes winding in four layers in the stator slots 11.

It should be noted that, because six phases of wave windings in each pole are sequentially wound in six stator slots 11, after any phase of wave winding in the six-phase flat wire wave winding 20 is wound in the foregoing manner stating from the Xth slot, remaining phases of wave windings may be wound starting from another stator slot 11 other than the Xth slot in 6q slots of each pole.

In this embodiment, P=8, q=1. Therefore, each phase of wave winding is wound in eight slots, and a winding manner of any phase of wave winding is:

$$X_1-[X+6]_2-[X+12]_1-[X+18]_2-[X+24]_1-[X+30]_2-[X+36]_1-[X+42]_2-$$

$$X_3-[X+6]_4-[X+12]_3-[X+18]_4-[X+24]_3-[X+30]_4-[X+36]_3-[X+42]_4-$$

$$X_4[X+42]_3-[X+36]_4-[X+30]_3-[X+24]_4-[X+18]_3-[X+12]_4-[X+6]_3-$$

$$X_2[X+42]_1-[X+36]_2-[X+30]_1-[X+24]_2-[X+18]_1-[X+12]_2-[X+6]_1.$$

For example, the U-phase wave winding 21 may be wound starting from the first slot, that is, X=1, and when the U-phase wave winding is wound in one layer in the eight stator slots 11, winding is: the L1 layer in the first slot, the L2 layer in the seventh slot, the L1 layer in the 13$^{th}$ slot, the L2 layer in the 19$^{th}$ slot, the L1 layer in the 25$^{th}$ slot, the L2 layer in the 31$^{st}$ slot, the L1 layer in the 37$^{th}$ slot, and the L2 layer in the 43$^{rd}$ slot.

When the U-phase wave winding is wound in another layer in the eight stator slots 11, winding is: the L3 layer in the first slot, the L4 layer in the seventh slot, the L3 layer in the 13$^{th}$ slot, the L4 layer in the 19$^{th}$ slot, the L3 layer in the 25$^{th}$ slot, the L4 layer in the 31$^{st}$ slot, the L3 layer in the 37$^{th}$ slot, and the L4 layer in the 43$^{rd}$ slot.

When the U-phase wave winding continues to be wound in another layer in the eight stator slots 11, winding is: the L4 layer in the first slot, the L3 layer in the 43$^{rd}$ slot, the L4 layer in the 37$^{th}$ slot, the L3 layer in the 31$^{st}$ slot, the L4 layer in the 25$^{th}$ slot, the L3 layer in the 19$^{th}$ slot, the L4 layer in the 13$^{th}$ slot, and the L3 layer in the seventh slot.

When the U-phase wave winding is wound in the last layer in the eight stator slots 11, winding is: the L2 layer in the first slot, the L1 layer in the 43$^{rd}$ slot, the L2 layer in the 37$^{th}$ slot, the L1 layer in the 31$^{st}$ slot, the L2 layer in the 25$^{th}$ slot, the L1 layer in the 19$^{th}$ slot, the L2 layer in the 13$^{th}$ slot, and the L1 layer in the seventh slot.

When the A-phase wave winding 24 is wound, X=2 may be selected. When the W-phase wave winding 23 is wound, X=3 may be selected. When the C-phase wave winding 26 is wound, X=4 may be selected. When the V-phase wave winding 22 is wound, X=5 may be selected. When the B-phase wave winding 25 is wound, X=6 may be selected.

After the six-phase flat wire wave winding 20 is wound in four layers in the stator slots 11 based on the foregoing winding manner, wave winding distribution in each stator slot 11 is shown in Table 1. S1 to S48 in Table 1 are numbers of the 48 stator slots.

stator slots 11 in which the U-phase wave winding 21 is wound are respectively: the seventh slot, the 13$^{th}$ slot, the 19$^{th}$ slot, the 25$^{th}$ slot, the 31$^{st}$ slot, the 37$^{th}$ slot, the 43$^{rd}$ slot, and the 49$^{th}$ slot. In this embodiment, because there are 48 stator slots 11, the 49$^{th}$ slot is the first slot.

As shown in FIG. 8, when the U-phase wave winding 21 is wound in one layer in the stator slots 11, winding may be performed along a clockwise arrow direction in FIG. 8, namely, in ascending order of slot numbers. Refer to black boxes in FIG. 8 for a winding sequence: the L1 layer of the seventh slot, the L2 layer of the 13$^{th}$ slot, the L1 layer of the 19$^{th}$ slot, the L1 layer of the 25$^{th}$ slot, the L1 layer of the 31$^{st}$ slot, the L1 layer of the 37$^{th}$ slot, the L1 layer of the 43$^{rd}$ slot, and the L2 layer of the first slot.

Figure 9:
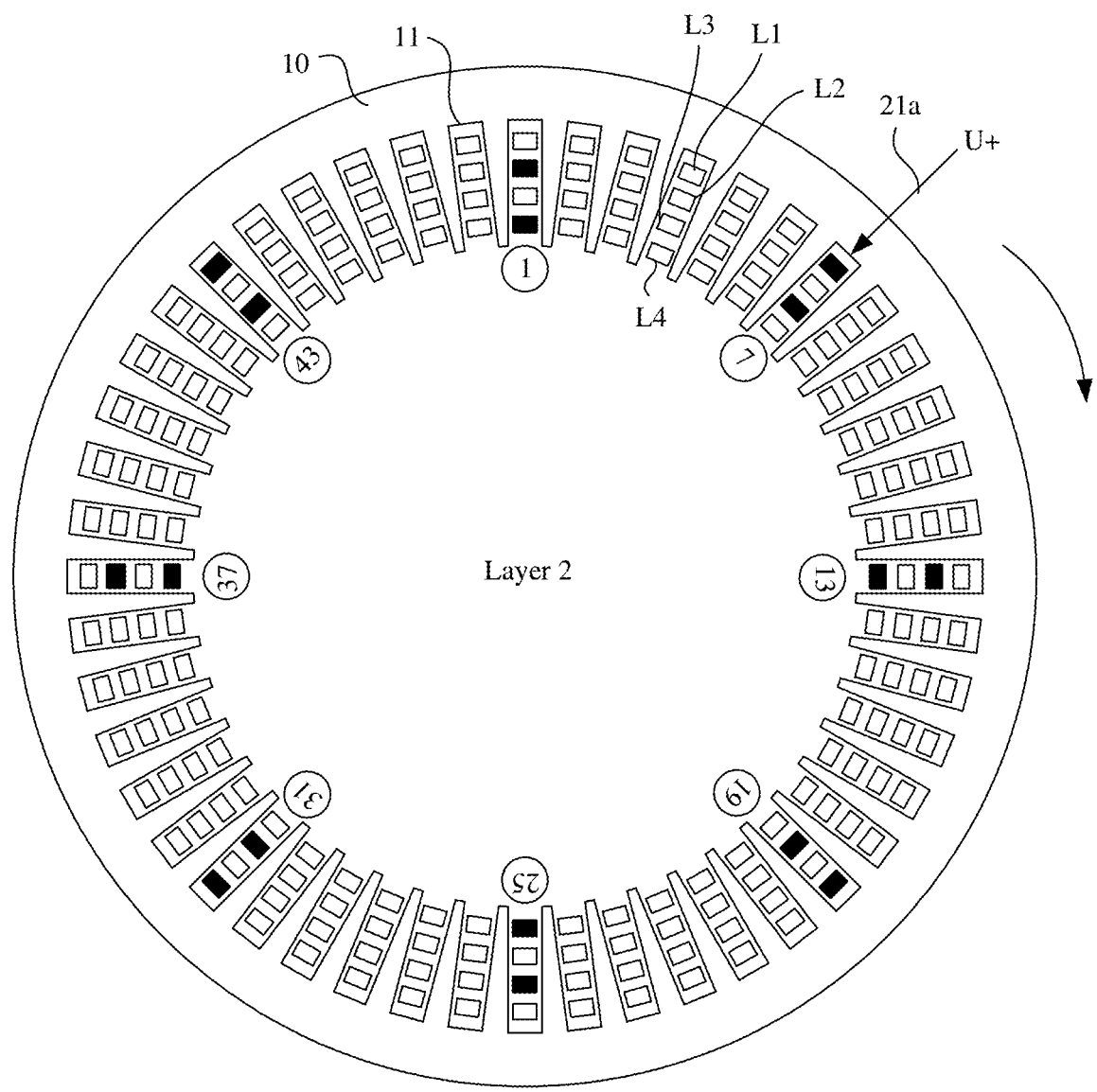
FIG. 9 is a schematic diagram of a cross section when a U-phase wave winding is wound in two layers in a stator slot in a six-phase motor according to an embodiment.

When the U-phase wave winding 21 is wound in the second layer in the stator slots 11, as shown in FIG. 9, winding continues to be performed along the clockwise arrow direction, and the winding sequence is: the L3 layer of the seventh slot, the L4 layer of the 13$^{th}$ slot, the L3 layer of the 19$^{th}$ slot, the L4 layer of the 25$^{th}$ slot, the L3 layer of the 31$^{st}$ slot, the L4 layer of the 37$^{th}$ slot, the L3 layer of the 43$^{rd}$ slot, and the L4 layer of the first slot.

Figure 10:
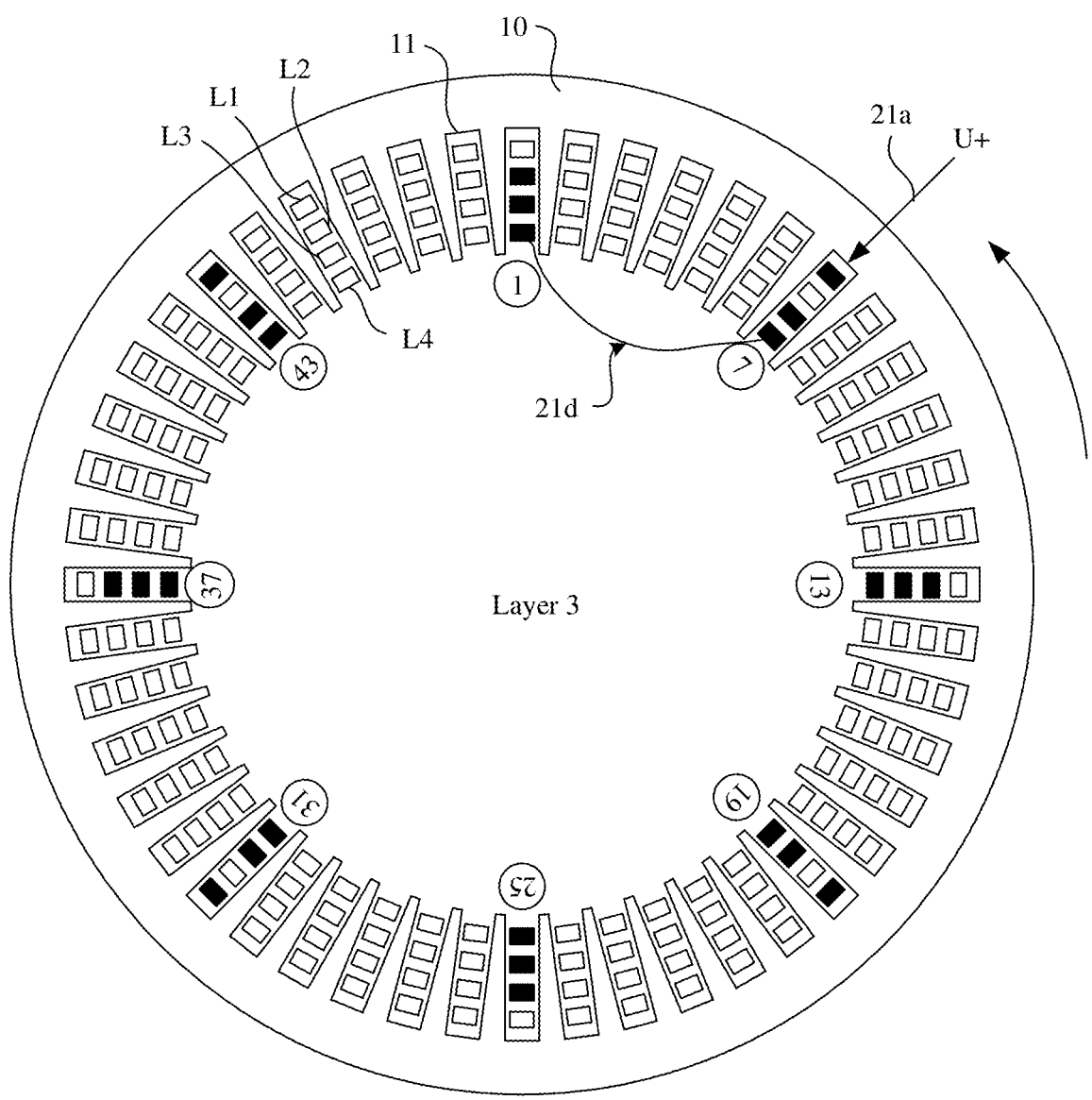
FIG. 10 is a schematic diagram of a cross section when a U-phase wave winding is wound in three layers in a stator slot in a six-phase motor according to an embodiment.

When the U-phase wave winding 21 is wound in the third layer in the stator slots 11, as shown in FIG. 10, winding is performed along an anticlockwise arrow direction, namely, in descending order of slot numbers, and the winding sequence is: the L4 layer of the seventh slot, the L3 layer of the first slot, the L4 layer of the 43$^{rd}$ slot, the L3 layer of the 37$^{th}$ slot, the L4 layer of the 31$^{st}$ slot, the L3 layer of the 25$^{th}$ slot, the L4 layer of the 19$^{th}$ slot, and the L3 layer of the 13$^{th}$ slot.

Figure 11:
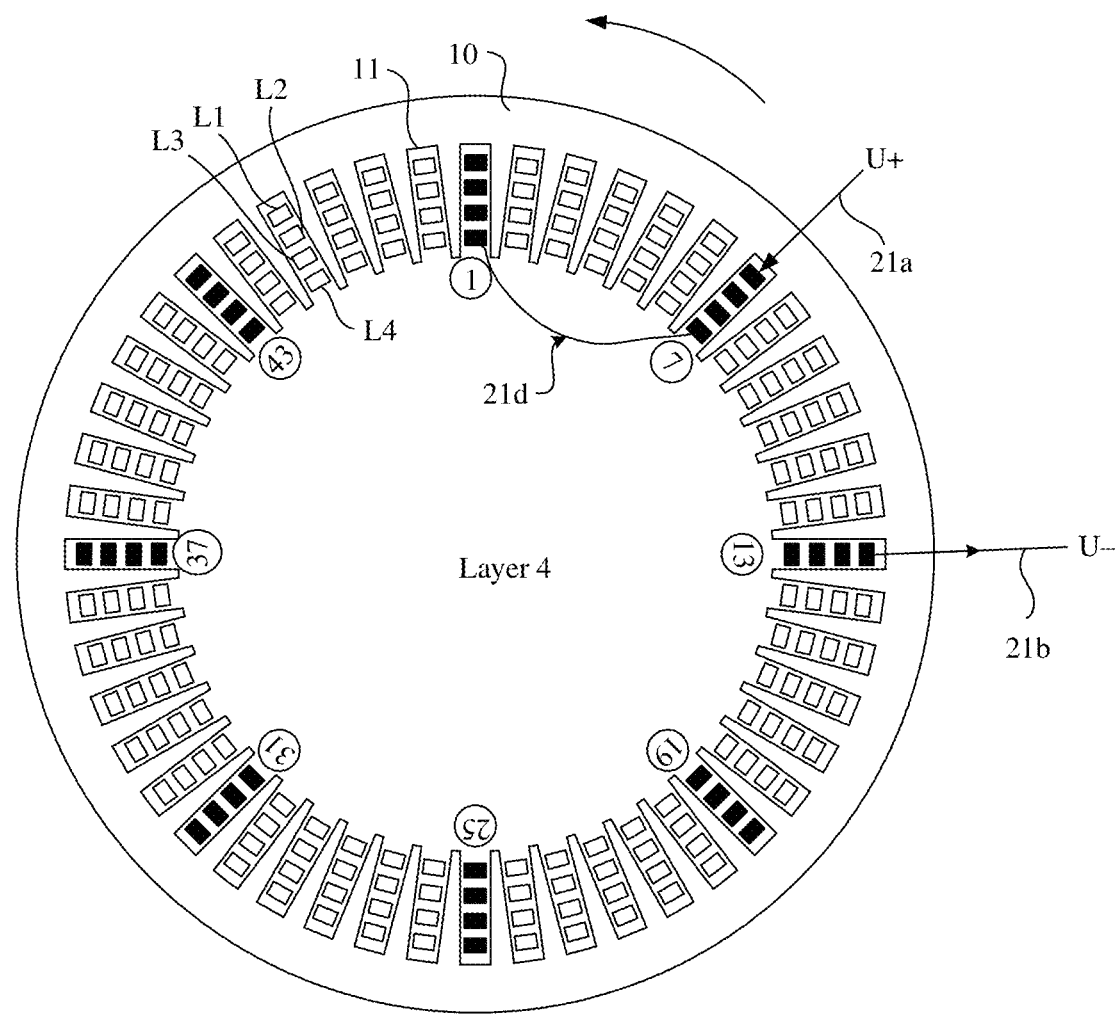
FIG. 11 is a schematic diagram of a cross section when a U-phase wave winding is wound in four layers in a stator slot in a six-phase motor according to an embodiment.

When the U-phase wave winding 21 is wound in the fourth layer in the stator slots 11, as shown in FIG. 11, winding is performed along the clockwise arrow direction: the L2 layer of the seventh slot, the L1 layer of the first slot, the L2 layer of the 43$^{rd}$ slot, the L1 layer of the 37$^{th}$ slot, the L2 layer of the 31$^{st}$ slot, the L1 layer of the 25$^{th}$ slot, the L2 layer of the 19$^{th}$ slot, and the L1 layer of the 13$^{th}$ slot. As

TABLE 1

(q = 1, a = 1)
Table 1 (q = 1, a = 1)

| S1 | S2 | S3 | S4 | S5 | S6 | S7 | S8 | S9 | S10 | S11 | S12 | S13 | S14 | S15 | S16 |
|---|---|---|---|---|---|---|---|---|---|---|---|---|---|---|---|
| U+ | A+ | W+ | C+ | V+ | B+ | U− | A− | W− | C− | V− | B− | U+ | A+ | W+ | C+ |
| U+ | A+ | W+ | C+ | V+ | B+ | U− | A− | W− | C− | V− | B− | U+ | A+ | W+ | C+ |
| U+ | A+ | W+ | C+ | V+ | B+ | U− | A− | W− | C− | V− | B− | U+ | A+ | W+ | C+ |
| U+ | A+ | W+ | C+ | V+ | B+ | U− | A− | W− | C− | V− | B− | U+ | A+ | W+ | C+ |

| S17 | S18 | S19 | S20 | S21 | S22 | S23 | S24 | S25 | S26 | S27 | S28 | S29 | S30 | S31 | S32 |
|---|---|---|---|---|---|---|---|---|---|---|---|---|---|---|---|
| V+ | B+ | U− | A− | W− | C− | V− | B− | U+ | A+ | W+ | C+ | V+ | B+ | U− | A− |
| V+ | B+ | U− | A− | W− | C− | V− | B− | U+ | A+ | W+ | C+ | V+ | B+ | U− | A− |
| V+ | B+ | U− | A− | W− | C− | V− | B− | U+ | A+ | W+ | C+ | V+ | B+ | U− | A− |
| V+ | B+ | U− | A− | W− | C− | V− | B− | U+ | A+ | W+ | C+ | V+ | B+ | U− | A− |

| S33 | S34 | S35 | S36 | S37 | S38 | S39 | S40 | S41 | S42 | S43 | S44 | S45 | S46 | S47 | S48 |
|---|---|---|---|---|---|---|---|---|---|---|---|---|---|---|---|
| W− | C− | V− | B− | U+ | A+ | W+ | C+ | V+ | B+ | U− | A− | W− | C− | V− | B− |
| W− | C− | V− | B− | U+ | A+ | W+ | C+ | V+ | B+ | U− | A− | W− | C− | V− | B− |
| W− | C− | V− | B− | U+ | A+ | W+ | C+ | V+ | B+ | U− | A− | W− | C− | V− | B− |
| W− | C− | V− | B− | U+ | A+ | W+ | C+ | V+ | B+ | U− | A− | W− | C− | V− | B− |

It should be noted that, in this embodiment, when each phase of wave winding is wound in each stator slot 11, X may alternatively be greater than or equal to 7. For example, as shown in FIG. 7, X=7. The U-phase wave winding 21 may be wound starting from the seventh slot, and the eight shown in FIG. 11, the wire-in end 21a and the wire-out end 21b of the U-phase wave winding 21 are both located at the bottom of the stator slot 11, may be led in and led out both from the L1 layer, to facilitate connection of an end portion of a led-out wire.

In this embodiment, because winding of each phase of wave winding in first two layers (for example, the L1 layer and the L3 layer) is performed in a direct opposite to that of winding in last two layers (for example, the L4 layer and the L2 layer), each phase of wave winding has a jumper. One end of the jumper is connected to the (2M)th layer of winding in the [X+6×(P−1)]th slot, and the other end of the jumper is connected to the (2M)th layer of winding in the Xth slot. For example, as shown in FIG. 7 and FIG. 10, when M=2, the U-phase wave winding 21 has a jumper 21d, and two ends of the jumper 21d are respectively connected to the L4 layer of the seventh slot and the L4 layer of the first slot.

A span of the jumper of each phase of wave winding is y, and y is 6q. In this embodiment, a quantity q of the slots of each phase of wave winding in each pole is 1. Therefore, as shown in FIG. 7, the span y of the jumper 21d is 6. In this embodiment, when q=1, a span between the wire-in end and the wire-out end of each phase of wave winding is the same as a span between adjacent effective edges, and y=6. Therefore, when q=1, it is ensured that spans of winding parts of phases of wave windings are consistent, to reduce manufacturing costs.

In addition, as shown in FIG. 6, the wire-in ends and the wire-out ends of the phases of wave windings are close to each other, and the wire-out ends of the phases of wave windings have a same twist angle (namely, a bending angle). In this way, the wire-out ends of the phases of wave windings can be directly led out in parallel, or led out by using a copper busbar (busbar). When the wire-in ends and the wire-out ends of the phases of wave windings are welded, welding points are distributed in a concentrated manner, so that a length of the busbar is reduced.

Figure 12:
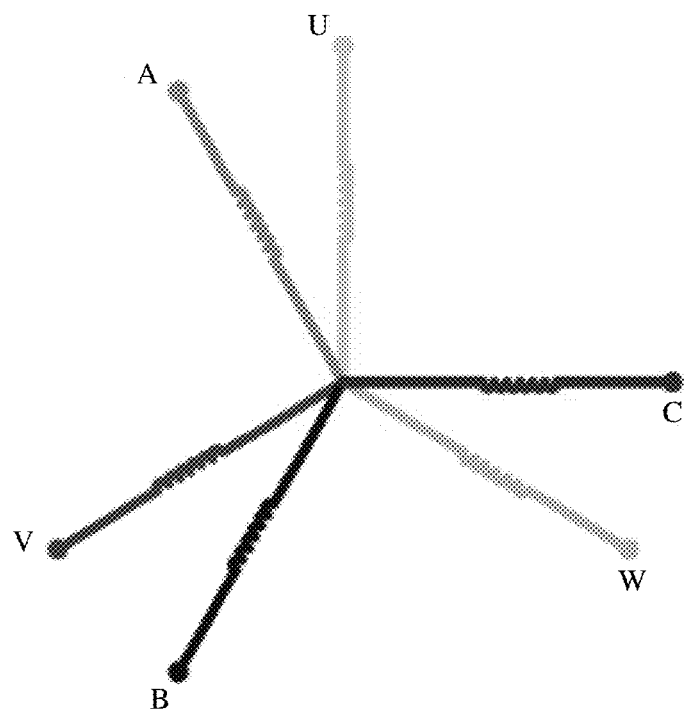
FIG. 12 is a schematic diagram of a connection manner in which a neutral point is shared in a six-phase flat wire wave winding in a six-phase motor according to an embodiment.
Figure 13:
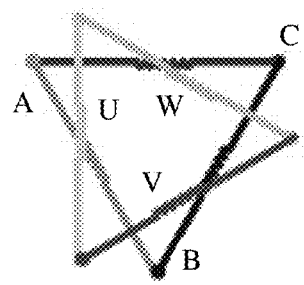
FIG. 13 is a schematic diagram of a connection manner (triangular) in which a neutral point is not shared in a six-phase flat wire wave winding in a six-phase motor according to an embodiment.
Figure 14:
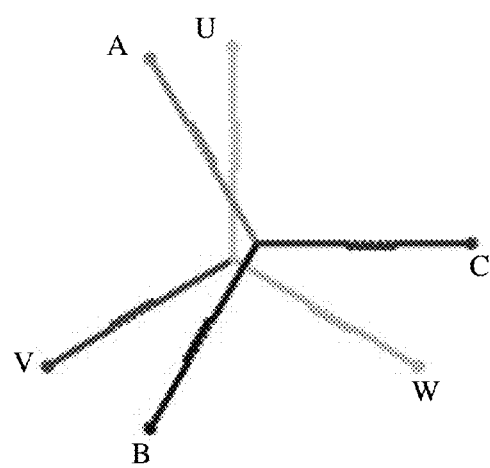
FIG. 14 is a schematic diagram of a connection manner (star) in which a neutral point is not shared in a six-phase flat wire wave winding in a six-phase motor according to an embodiment.

In this embodiment, the wire-in ends and the wire-out ends of the six-phase flat wire wave winding 20 may use a star connection manner in which a neutral point is shared, as shown in FIG. 12, or may use a star connection manner in which a neutral point is not shared, as shown in FIG. 13, or may use a triangular connection manner in FIG. 14. In this embodiment, wiring of the phases of the wave windings is flexible, and may be selected based on a design requirement.

It should be noted that, when M=3, a quantity of layers in which the wave winding is wound in each stator slot is 6, and in this case, a winding manner of any phase of wave winding is:

$$X_1-[X+6\times1]_2-[X+6\times2]_1-[X+6\times3]_2\ldots-[X+6\times(P-1)]_2-$$

$$X_3-[X+6\times1]_4-[X+6\times2]_3-[X+6\times3]_4\ldots-[X+6\times(P-1)]_4-$$

$$X_5-[X+6\times1]_6-[X+6\times2]_5-[X+6\times3]_6\ldots-[X+6\times(P-1)]_6-$$

$$X_6-[X+6\times(P-1)]_5-[X+6\times(P-2)]_6-[X+6\times(P-3)]_5\ldots-[X+6\times1]_5-$$

$$X_4-[X+6\times(P-1)]_3-[X+6\times(P-2)]_4-[X+6\times(P-3)]_3\ldots-[X+6\times1]_3-$$

$$X_2-[X+6\times(P-1)]_1-[X+6\times(P-2)]_2-[X+6\times(P-3)]_1\ldots-[X+6\times1]_1$$

That is, during winding, in a same stator slot, first, winding of each phase of wave winding is performed in the L1 layer, the L3 layer, and the L5 layer, and then, winding is performed in the L6 layer, the L4 layer, and the L2 layer. One end of a jumper of each phase of wave winding is connected to the sixth layer of winding in the [X+6×(P−1)]th slot, and the other end of the jumper is connected to the sixth layer of winding in the Xth slot.

In this embodiment, when P=8, a winding manner of any phase of wave winding is:

$$X_1-[X+6\times1]_2-[X+6\times2]_1-[X+6\times3]_2-[X+6\times4]_1-[X+6\times5]_2-[X+6\times6]_1-[X+6\times7]_2-$$

$$X_3-[X+6\times1]_4-[X+6\times2]_3-[X+6\times3]_4-[X+6\times4]_3-[X+6\times5]_4-[X+6\times6]_3-[X+6\times7]_4-$$

$$X_5-[X+6\times1]_6-[X+6\times2]_5-[X+6\times3]_6-[X+6\times4]_5-[X+6\times5]_6-[X+6\times6]_5-[X+6\times7]_6-$$

$$X_6-[X+6\times7]_5-[X+6\times6]_6-[X+6\times5]_5-[X+6\times4]_6-[X+6\times3]_5-[X+6\times2]_6-[X+6\times1]_5-$$

$$X_4-[X+6\times7]_3-[X+6\times6]_4-[X+6\times5]_3-[X+6\times4]_4-[X+6\times3]_3-[X+6\times2]_4-[X+6\times1]_3-$$

$$X_2-[X+6\times7]_1-[X+6\times6]_2-[X+6\times5]_1-[X+6\times4]_2-[X+6\times3]_1-[X+6\times2]_2-[X+6\times1]_1.$$

It should be noted that, in this embodiment, description is provided by using an example in which winding is performed in four layers and six layers. In actual application, quantities of winding layers of each stator slot 11 include but are not limited to four and six, or may be two, eight, or the like. Refer to the winding manner of four layers and six layers for the winding manner.

Therefore, in the six-phase flat wire wave winding provided in this embodiment, in the foregoing winding manner, each phase of wave winding has conductors in all layers of a same stator slot, and the wave windings are uniformly and symmetrically distributed. Potentials of branches are balanced, and there is no loop current. Conductors in different layers of a same slot are in-phase, and do not need to be isolated by insulating paper. This helps improve a slot fill factor and reduce costs. In addition, problems that a flat wire winding process is highly difficult and manufacturing costs are high due to an increase in a quantity of phases of the six-phase motor are effectively resolved.

Embodiment 2

In this embodiment, for example, the six-phase motor 100 is a six-pole motor, that is, P=6, and a quantity q of slots of each phase in each pole is 2, that is, in each pole, each phase of wave winding is wound in two stator slots 11. Each phase of wave winding includes one branch winding, that is, a=1, and there is one parallel branch in each phase. Therefore, the branch winding in each phase is wound in two stator slots 11 in each pole, and a quantity of the stator slots 11 is 72. The 72 stator slots 11 are respectively represented by S1 to S72 in Table 2, or represented by numbers 1 to 72 in FIG. 15.

A quantity of layers of each phase of wave winding in the stator slot 11 is 2M. In this embodiment, for example, starting from an Xth (X<13) slot, $X_i$ is defined as an ith layer of an Xth slot, and a winding manner of any phase of wave winding is:

$$X_1[X+12\times1]_2-[X+12\times2]-[X+12\times3]_2\ldots-[X+12\times(P-1)]_2-$$

$$X_3[X+12\times1]_4-[X+12\times2]_3-[X+12\times3]_4\ldots-[X+12\times(P-1)]_4-$$

$$\ldots$$

$$X_{2M-1}-[X+12\lambda1]_{2M}-[X+12\lambda2]_{2M-1}-[X+12\lambda3]_{2M}\ldots-[X+12\times(P-1)]_{2M}-$$

$X_{2M}-[X+12\times(P-1)]_{2M-1}-[X+12\times(P-2)]_{2M}-[X+12\times(P-3)]_{2M-1}\ldots-[X+12\times1]_{2M-1}-$ $\ldots$ $X_4-[X+12\times(P-1)]_3-[X+12\times(P-2)]_4-[X+12\times(P-3)]_3\ldots-[X+12\times1]_3-$ $X_2-[X+12\times(P-1)]_1-[X+12\times(P-2)]_2-[X+12\times(P-3)]_1\ldots-[X+12\times1]_1-$ $[X+1]_1-[X+1+12\times1]_2-[X+1+12\times2]_1-[X+1+12\times3]_2\ldots-[X+1+12\times(P-1)]_2-$ $[X+1]_3-[X+1+12\times1]_4-[X+1+12\times2]_3-[X+1+12\times3]_4\ldots-[X+1+12\times(P-1)]_4-$ $\ldots$ $[X+1]_{2M-1}-[X+1+12\times1]_{2M}-[X+1+12\times2]_{2M-1}-[X+1+12\times3]_{2M}\ldots-[X+1+12\times(P-1)]_{2M}-$ $[X+1]_{2M}-[X+1+12\times(P-1)]_{2M-1}-[X+1+12\times(P-2)]_{2M}-[X+1+12\times(P-3)]_{2M-1}\ldots$ $\ldots-[X+1]_{2M-1}-$ $\ldots$ $[X+1]_4-[X+1+12\times(P-1)]_3-[X+1+12\times(P-2)]_4-[X+1+12\times(P-3)]_3\ldots-[X+1+12]_3-$ $[X+1]_2-[X+1+12\times(P-1)]_1-[X+1+12\times(P-2)]_2-[X+1+12\times(P-3)]_1\ldots-[X+1+12]_1$ Based on the foregoing winding manner, it is understood that, when each phase of wave winding is wound in two stator slots 11 of each pole, each phase of wave winding first forms a first coil in one of the stator slots 11 in each pole based on the winding manner in the foregoing Embodiment 1, and then, each phase of wave winding forms a second coil in the other stator slot 11 in each pole based on the winding manner in Embodiment 1. The first coil is connected in series to the second coil. A difference between phases of the first coil and the second coil is 30/q degrees. When each phase of wave winding is wound in two stator slots 11 of each pole, the two stator slots 11 corresponding to each phase of wave winding are adjacent.

Figure 15:
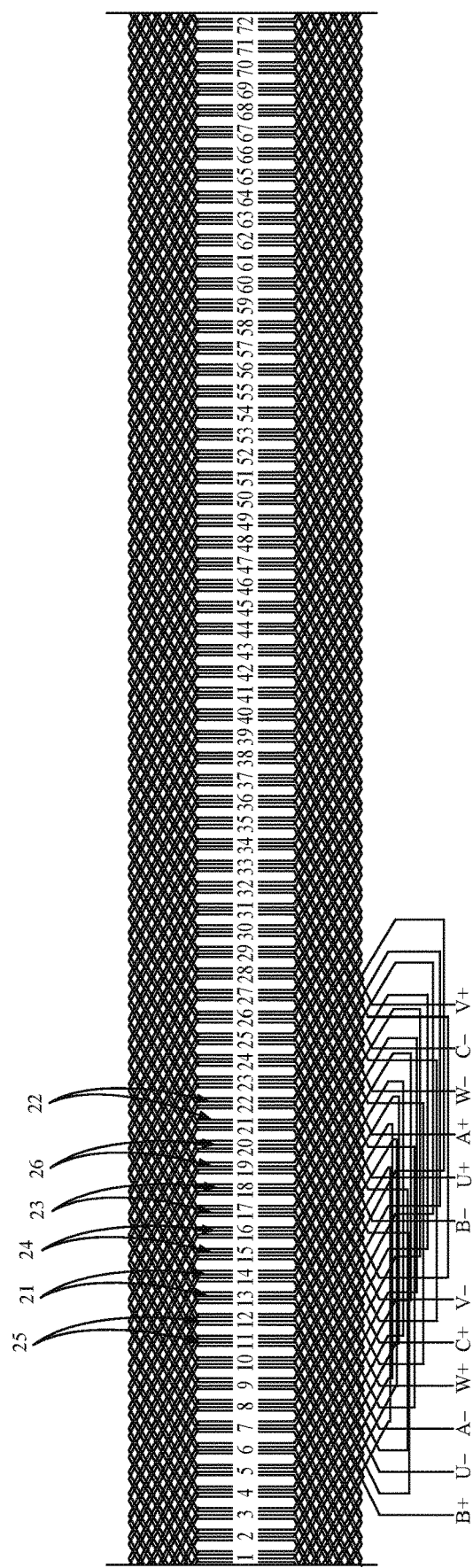
FIG. 15 is a schematic diagram of an unfolded six-phase flat wire wave winding when q=2 and a=1 in a six-phase motor according to an embodiment.

For example, when M=2, each stator slot 11 has four layers of the wave winding. A winding manner in which any phase of wave winding is wound in four layers in the stator slot 11 is:

$X_1-[X+12\times1]_2-[X+12\times2]_1-[X+12\times3]_2\ldots-[X+12\times(P-1)]_2-$ $X_3-[X+12\times1]_4-[X+12\times2]_3-[X+12\times3]_4\ldots-[X+12\times(P-1)]_4-$ $X_4-[X+12\times(P-1)]_3-[X+12\times(P-2)]_4-[X+12\times(P-3)]_3\ldots-[X+12\times1]_3-$ $X_2-[X+12\times(P-1)]_1-[X+12\times(P-2)]_2-[X+12\times(P-3)]_1\ldots-[X+12\times1]_1-$ $[X+1]_1-[X+1+12\times1]_2-[X+1+12\times2]_1-[X+1+12\times3]_2\ldots-[X+1+12\times(P-1)]_2-$ $[X+1]_3-[X+1+12\times1]_4-[X+1+12\times2]_3-[X+1+12\times3]_4\ldots-[X+1+12\times(P-1)]_4-$ $[X+1]_4-[X+1+12\times(P-1)]_3-[X+1+12\times(P-2)]_4-[X+1+12\times(P-3)]_3\ldots-[X+1+12]_3-$ $[X+1]_2-[X+1+12\times(P-1)]_1-[X+1+12\times(P-2)]_2-[X+1+12\times(P-3)]_1\ldots-[X+1+12]_1$ In this embodiment, P=6. Therefore, as shown in FIG. 15, each phase of wave winding in each pole is wound in two adjacent stator slots 11, and a winding manner in which any phase of wave winding is wound in four layers is:

$X_1-[X+12]_2-[X+24]_1-[X+36]_2-[X+48]_1-[X+60]_2-$ $X_3-[X+12]_4-[X+24]_3-[X+36]_4-[X+48]_3-[X+60]_4-$ $X_4-[X+60]_3-[X+48]_4-[X+36]_3-[X+24]_4-[X+12]_3-$ $X_2-[X+60]_1-[X+48]_2-[X+36]_1-[X+24]_2-[X+12]_1-$ $[X+1]_1-[X+1+12]_2-[X+1+24]_1-[X+1+36]_2-[X+1+48]_1-[X+1+60]_2-$ $[X+1]_3-[X+1+12]_4-[X+1+24]_3-[X+1+36]_4-[X+1+48]_3-[X+1+60]_4-$ $[X+1]_4-[X+1+60]_3-[X+1+48]_4-[X+1+36]_3-[X+1+24]_4-[X+1+12]_3-$ $[X+1]_2-[X+1+60]_1-[X+1+48]_2-[X+1+36]_1-[X+1+24]_2-[X+1+12]_1$.

In this embodiment, when the U-phase wave winding 21 is wound, X=1 is selected. When the A-phase wave winding 24 is wound, X=3 may be selected. When the W-phase wave winding 23 is wound, X=5 may be selected. When the C-phase wave winding 26 is wound, X=7 may be selected. When the V-phase wave winding 22 is wound, X=9 may be selected. When the B-phase wave winding 25 is wound, X=11 may be selected.

After the six-phase flat wire wave winding 20 is wound in four layers in the stator slots 11 based on the foregoing winding manner, wave winding distribution in the stator slots 11 is shown in Table 2:

TABLE 2

| (q = 2, a = 1) | | | | | | | | | | | | | | | |
| --- | --- | --- | --- | --- | --- | --- | --- | --- | --- | --- | --- | --- | --- | --- | --- |
| S1 | S2 | S3 | S4 | S5 | S6 | S7 | S8 | S9 | S10 | S11 | S12 | S13 | S14 | S15 | S16 |
| U+ | U+ | A+ | A+ | W− | W− | C− | C− | V+ | V+ | B+ | B+ | U− | U− | A− | A− |
| U+ | U+ | A+ | A+ | W− | W− | C− | C− | V+ | V+ | B+ | B+ | U− | U− | A− | A− |
| U+ | U+ | A+ | A+ | W− | W− | C− | C− | V+ | V+ | B+ | B+ | U− | U− | A− | A− |
| U+ | U+ | A+ | A+ | W− | W− | C− | C− | V+ | V+ | B+ | B+ | U− | U− | A− | A− |
| S17 | S18 | S19 | S20 | S21 | S22 | S23 | S24 | S25 | S26 | S27 | S28 | S29 | S30 | S31 | S32 |
| W+ | W+ | C+ | C+ | V− | V− | B− | B− | U+ | U+ | A+ | A+ | W− | W− | C− | C− |
| W+ | W+ | C+ | C+ | V− | V− | B− | B− | U+ | U+ | A+ | A+ | W− | W− | C− | C− |

TABLE 2-continued (q = 2, a = 1)

| W+ | W+ | C+ | C+ | V− | V− | B− | B− | U+ | U+ | A+ | A+ | W− | W− | C− | C− |
|----|----|----|----|----|----|----|----|----|----|----|----|----|----|----|----|
| W+ | W+ | C+ | C+ | V− | V− | B− | B− | U+ | U+ | A+ | A+ | W− | W− | C− | C− |
| S33 | S34 | S35 | S36 | S37 | S38 | S39 | S40 | S41 | S42 | S43 | S44 | S45 | S46 | S47 | S48 |
| V+ | V+ | B+ | B+ | U− | U− | A− | A− | W+ | W+ | C+ | C+ | V− | V− | B− | B− |
| V+ | V+ | B+ | B+ | U− | U− | A− | A− | W+ | W+ | C+ | C+ | V− | V− | B− | B− |
| V+ | V+ | B+ | B+ | U− | U− | A− | A− | W+ | W+ | C+ | C+ | V− | V− | B− | B− |
| V+ | V+ | B+ | B+ | U− | U− | A− | A− | W+ | W+ | C+ | C+ | V− | V− | B− | B− |
| S49 | S50 | S51 | S52 | S53 | S54 | S55 | S56 | S57 | S58 | S59 | S60 | S61 | S62 | S63 | S64 |
| U+ | U+ | A+ | A+ | W− | W− | C− | C− | V+ | V+ | B+ | B+ | U− | U− | A− | A− |
| U+ | U+ | A+ | A+ | W− | W− | C− | C− | V+ | V+ | B+ | B+ | U− | U− | A− | A− |
| U+ | U+ | A+ | A+ | W− | W− | C− | C− | V+ | V+ | B+ | B+ | U− | U− | A− | A− |
| U+ | U+ | A+ | A+ | W− | W− | C− | C− | V+ | V+ | B+ | B+ | U− | U− | A− | A− |

| S65 | | S66 | | S67 | | S68 | | S69 | | S70 | | S71 | | S72 | |
|-----|---|-----|---|-----|---|-----|---|-----|---|-----|---|-----|---|-----|---|
| W+ | | W+ | | C+ | | C+ | | V− | | V− | | B− | | B− | |
| W+ | | W+ | | C+ | | C+ | | V− | | V− | | B− | | B− | |
| W+ | | W+ | | C+ | | C+ | | V− | | V− | | B− | | B− | |
| W+ | | W+ | | C+ | | C+ | | V− | | V− | | B− | | B− | |

Figure 16:
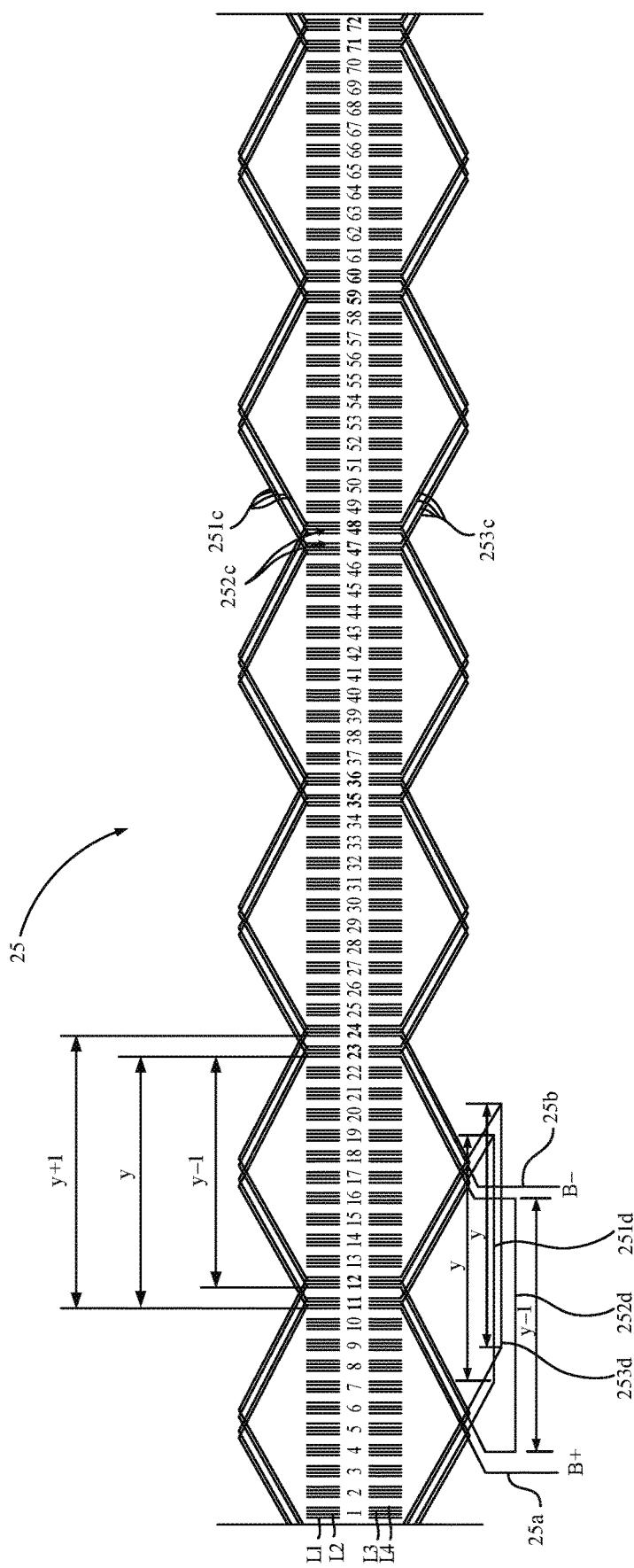
FIG. 16 is a schematic diagram of an unfolded U-phase wave winding when q=2 and a=1 in a six-phase motor according to an embodiment.

For example, as shown in FIG. 16, when the B-phase wave winding 25 is wound, X is 11, that is, the wire-in end 25a of the B-phase wave winding 25 starts from the L1 layer of the $11^{th}$ slot, and the B-phase wave winding 25 is wound in two adjacent layers in each pole. For example, in each magnetic pole, the B-phase wave winding 25 is separately wound in: the $11^{th}$ slot and the $12^{th}$ slot, the $23^{rd}$ slot and the $24^{th}$ slot, the $35^{th}$ slot and the $36^{th}$ slot, the $47^{th}$ slot and the $48^{th}$ slot, the $59^{th}$ slot and the $60^{th}$ slot, and the $71^{st}$ slot and the $72^{nd}$ slot.

Refer to FIG. 16 for winding of the B-phase wave winding 25. First, the B-phase wave winding 25 is wound in two layers in one of the stator slots 11 of each pole, and then, along an opposite direction, is wound in last two layers in the stator slot 11, to form the first coil. Then, the B-phase wave winding 25 is wound starting from the L1 layer of the $12^{th}$ slot, that is, the B-phase wave winding 25 is first wound in two layers in the other adjacent stator slot 11 of each pole, and then, along an opposite direction, is wound in last two layers in the adjacent stator slot 11, to form the second coil. The first coil is connected in series to the second coil to form the B-phase wave winding 25 shown in FIG. 16.

Each phase of wave winding has a first jumper 251d, a second jumper 252d, and a third jumper 253d. That is, each phase of wave winding has three jumpers. Two ends of the first jumper 251d are respectively connected to a (2M)th layer of an $[X+12\times(P-1)]^{th}$ slot and a (2M)th layer of an Xth slot, two ends of the second jumper 252d are respectively connected to the first layer of an (X+12)th slot and the first layer of an (X+1)th slot, and two ends of the third jumper 253d are respectively connected to an (2M)th layer of an $[X+1+12\times(P-1)]^{th}$ slot and a (2M)th layer of the (X+1)th slot.

For example, in this embodiment, when P=6 and M=2, as shown in FIG. 16, the B-phase wave winding 25 has the first jumper 251d, the second jumper 252d, and the third jumper 253d. The two ends of the first jumper 251d are respectively connected to the L4 layer of the $71^{st}$ slot and the L4 layer of the $11^{th}$ slot, the two ends of the second jumper 252d are respectively connected to the L1 layer of the $23^{rd}$ slot and the L1 layer of the $12^{th}$ slot, and the two ends of the third jumper 253d are respectively connected to the L4 layer of the $72^{nd}$ slot and the L4 layer of the $12^{th}$ slot.

As shown in FIG. 16, a span of the first jumper 251d is y, a span of the second jumper 252d is y−1, and a span of the third jumper 253d is y, where y=6q and q=2. Therefore, y=12. Therefore, the span of the first jumper 251d is 12, the span of the second jumper 252d is 11, and the span of the third jumper 253d is 12.

In this embodiment, a span between a wire-in end and a wire-out end of each phase of wave winding is y+1, where y=12. Therefore, the span between the wire-in end and the wire-out end of each phase of wave winding is 13. Therefore, in the six-phase motor 100 provided in this embodiment, spans between the wire-in ends and the wire-out ends of the phases of the wave windings are the same, and the wire-in ends and the wire-out ends of the phases of wave windings are all located at the bottom or the opening of the stator slots 11. In this way, when the wire-out ends and the wire-in ends of the phases of wave windings are welded, as shown in FIG. 15, the wire-in ends and the wire-out ends of the phases of wave windings are close to each other, and the wire-out ends of the phases of wave windings have a same twist angle (namely, a bending angle). In this way, the wire-out ends of the phases of wave windings can be directly led out in parallel, or led out by using a copper busbar (busbar). When the wire-in ends and the wire-out ends of the phases of wave windings are welded, welding points are distributed in a concentrated manner, so that a length of the busbar is reduced.

In this embodiment, as shown in FIG. 16, there is a wire between the wire-in end 25a and the wire-out end 25b of the B-phase wave winding 25. The wire includes an effective edge 212c and two B-phase end portions. The two B-phase end portions are respectively a first B-phase end portion 211c and a second B-phase end portion 213c. The effective edge 212c is located in the stator slots 11 corresponding to the B-phase wave winding 25 (for example, the $11^{th}$ slot and the $12^{th}$ slot, the $23^{rd}$ slot and the $24^{th}$ slot, the $35^{th}$ slot and the $36^{th}$ slot, the $47^{th}$ slot and the $48^{th}$ slot, the $59^{th}$ slot and the $60^{th}$ slot, and the $71^{st}$ slot and the $72^{nd}$ slot). The first B-phase end portion 211c and the second B-phase end portion 213c are separately located outside the stator slots

11, and the first B-phase end portion 211c and the second B-phase portion 213c are respectively located on two ends of the effective edge 212c.

Each phase of wave winding is wound in 2M layers in one of the stator slots 11 of each pole, to form the first coil, and each phase of wave winding is wound in 2M layers in the other stator slot 11 of each pole, to form the second coil. The first coil is connected in series to the second coil by using the second jumper 252d.

For example, when M=2, the B-phase wave winding 25 is separately wound in four layers in the $11^{th}$ slot, the $23^{rd}$ slot, the $35^{th}$ slot, the $47^{th}$ slot, the $59^{th}$ slot, and the $71^{st}$ slot, to form the first coil, and the B-phase wave winding 25 is separately wound in four layers in the $12^{th}$ slot, the $24^{th}$ slot, the $36^{th}$ slot, the $48^{th}$ slot, the $60^{th}$ slot, and the $72^{nd}$ slot, to form the second coil. The winding manner of the second coil is the same as that of the first coil. The second coil performs overall translation by one stator slot 11, and the first coil is connected in series to the second coil by using the second jumper 252d.

A difference between phases of the first coil and the second coil is 30/q degrees.

In this embodiment, when M=3, winding is performed in six layers in each stator slot, which may be respectively an L1 layer, an L2 layer, an L3 layer, an L4 layer, an L5 layer (not shown), and an L6 layer (not shown), and a winding manner of any phase of wave winding is:

$X_1 - [X+12 \times 1]_2 - [X+12 \times 2]_1 - [X+12 \times 3]_2 \ldots - [X+12 \times (P-1)]_2 -$ $X_3 [X+12 \times 1]_4 - [X+12 \times 2]_3 - [X+12 \times 3]_4 \ldots - [X+12 \times (P-1)]_4 -$ $X_5 - [X+12 \times 1]_6 - [X+12 \times 2]_5 - [X+12 \times 3]_6 \ldots - [X+12 \times (P-1)]_6 -$ $X_6 - [X+12 \times (P-1)]_5 [X+12 \times (P-2)]_6 - [X+12 \times (P-3)]_5 \ldots - [X+12 \times 1]_5 -$ $X_4 - [X+12 \times (P-1)]_3 - [X+12 \times (P-2)]_4 - [X+12 \times (P-3)]_3 \ldots [X+12 \times 1]_3 -$ $X_2 - [X+12 \times (P-1)]_1 - [X+12 \times (P-2)]_2 - [X+12 \times (P-3)]_1 \ldots - [X+12 \times 1]_1 -$ $[X+1]_1 - [X+1+12 \times 1]_2 - [X+1+12 \times 2]_1 - [X+1+12 \times 3]_2 \ldots - [X+1+12 \times (P-1)]_2 -$ $[X+1]_3 [X+1+12 \times 1]_4 - [X+1+12 \times 2]_3 - [X+1+12 \times 3]_4 \ldots - [X+1+12 \times (P-1)]_4 -$ $[X+1]_5 - [X+1+12 \times 1]_6 - [X+1+12 \times 2]_5 - [X+1+12 \times 3]_6 \ldots - [X+1+12 \times (P-1)]_6 -$ $[X+1]_6 - [X+1+12 \times (P-1)]_5 - [X+1+12 \times (P-2)]_6 - [X+1+12 \times (P-3)]_5 \ldots - [X+1+12]_5$ $[X+1]_4 - [X+1+12 \times (P-1)]_3 - [X+1+12 \times (P-2)]_4 - [X+1+12 \times (P-3)]_3 \ldots - [X+1+12]_3 -$ $[X+1]_2 - [X+1+12 \times (P-1)]_1 - [X+1+12 \times (P-2)]_2 - [X+1+12 \times (P-3)]_1 \ldots - [X+1+12]_1$ When P=6, a winding manner of any phase of wave winding is:

$X_1 - [X+12 \times 1]_2 - [X+12 \times 2]_1 - [X+12 \times 3]_2 - [X+12 \times 4]_1 - [X+12 \times 5]_2 -$ $X_3 - [X+12 \times 1]_4 - [X+12 \times 2]_3 - [X+12 \times 3]_4 - [X+12 \times 4]_3 - [X+12 \times 5]_4 -$ $X_5 - [X+12 \times 1]_6 - [X+12 \times 2]_5 - [X+12 \times 3]_6 - [X+12 \times 4]_5 - [X+12 \times 5]_6 -$ $X_6 - [X+12 \times 5]_5 - [X+12 \times 4]_6 - [X+12 \times 3]_5 - [X+12 \times 2]_6 - [X+12 \times 1]_5 -$ $X_4 - [X+12 \times 5]_3 - [X+12 \times 4]_4 - [X+12 \times 3]_3 - [X+12 \times 2]_4 - [X+12 \times 1]_3 -$ $X_2 - [X+12 \times 5]_1 - [X+12 \times 4]_2 - [X+12 \times 3]_1 - [X+12 \times 2] - 2[X+12 \times 1]_1 -$ $[X+1]_1 - [X+1+12 \times 1]_2 - [X+1+12 \times 2]_1 - [X+1+12 \times 3]_2 - [X+1+12 \times 4]_1 - [X+1+12 \times 5]_2 -$ $[X+1]_3 - [X+1+12 \times 1]_4 - [X+1+12 \times 2]_3 - [X+1+12 \times 3]_4 - [X+1+12 \times 4]_3 - [X+1+12 \times 5]_4 -$ $[X+1]_5 - [X+1+12 \times 1]_6 - [X+1+12 \times 2]_5 - [X+1+12 \times 3]_6 - [X+1+12 \times 4]_5 - [X+1+12 \times 5]_6 -$ $[X+1]_6 - [X+1+12 \times 5]_5 - [X+1+12 \times 4]_6 - [X+1+12 \times 3]_5 - [X+1+12 \times 2]_6 - [X+1+12 \times 1]_5 -$ $[X+1]_4 - [X+1+12 \times 5]_3 - [X+1+12 \times 4]_4 - [X+1+12 \times 3]_3 - [X+1+12 \times 2]_4 - [X+1+12 \times]_1 -$ $[X+1]_2 - [X+1+12 \times 5]_1 - [X+1+12 \times 4]_2 - [X+1+12 \times 3]_1 - [X+1+12 \times 2]_2 - [X+1+12 \times 1]_1 -$ Each phase of wave winding is wound in six layers in one of the stator slots 11 of each pole to form the first coil, and each phase of wave winding is wound in six layers in the other adjacent stator slot 11 of each pole to form the second coil. The first coil is connected in series to the second coil by using the second jumper 252d.

It should be noted that, in this embodiment, description is provided by using an example in which winding is performed in four layers and six layers. In actual application, quantities of winding layers of each stator slot 11 include but are not limited to four and six, or may be two, eight, or the like. Refer to the winding manner of four layers and six layers for the winding manner.

Embodiment 3

Figure 17:
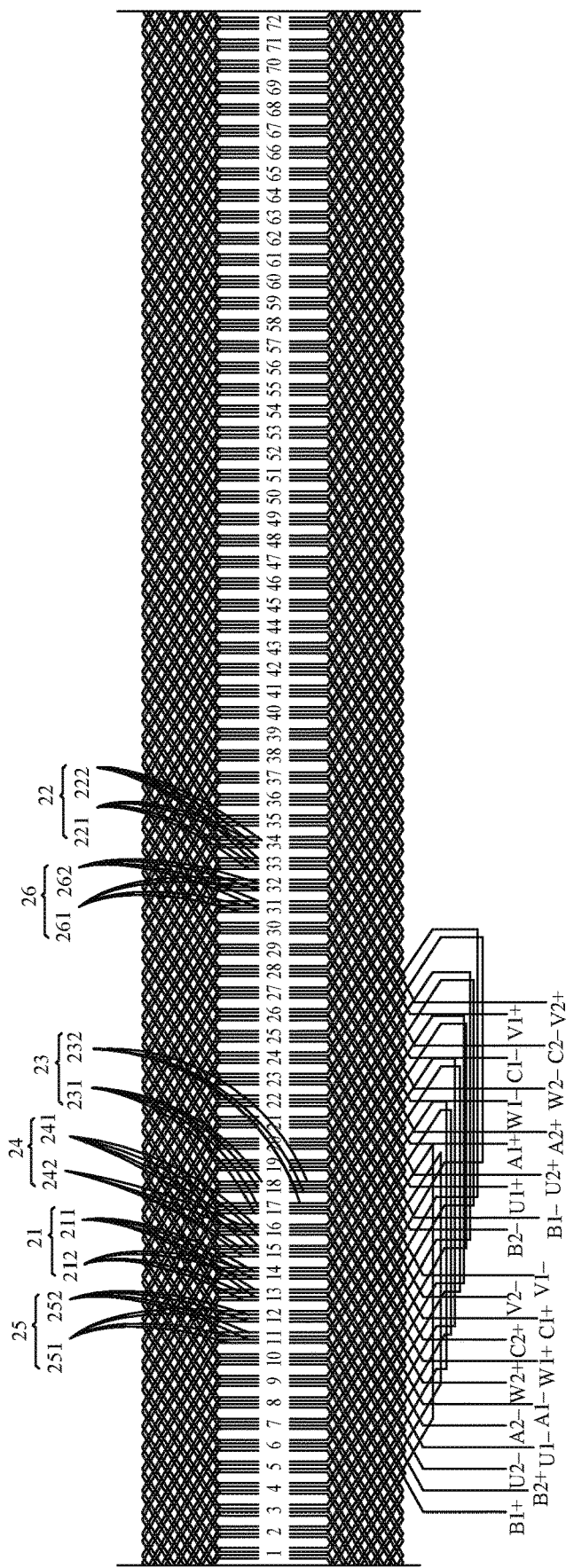
FIG. 17 is a schematic diagram of an unfolded six-phase flat wire wave winding when q=2 and a=2 in a six-phase motor according to an embodiment.

In this embodiment, each phase of wave winding includes a first branch winding and a second branch winding that are connected in parallel. That is, each phase of wave winding includes two branch windings, a=2, and the two branch windings are connected in parallel, that is, a quantity of parallel branches is 2. For example, as shown in FIG. 17, the U-phase wave winding 21 includes a first U-phase branch winding 211 (namely, U1) and a second U-phase branch winding 212 (namely, U2), the V-phase wave winding 22 includes a first V-phase branch winding 221 (namely, V1) and a second V-phase branch winding 222 (namely, V2), the W-phase wave winding 23 includes a first W-phase branch winding 231 (namely, W1) and a second W-phase branch winding 232 (namely, W2), the A-phase wave winding 24 includes a first A-phase branch winding 241 (namely, A1) and a second A-phase branch winding 242 (namely, A2), the B-phase wave winding 25 includes a first B-phase branch winding 251 (namely, B1) and a second B-phase branch winding 252 (namely, B2), and the C-phase wave winding 26 includes a first C-phase branch winding 261 (namely, C1) and a second C-phase branch winding 262 (namely, C2).

Each of the first branch winding and the second branch winding of each phase in each pole has two slots. In addition, each stator slot 11 has the first branch winding and the second branch winding that are in-phase and that have a same quantity of layers. The first branch winding and the second branch winding are alternately arranged in a same stator slot 11. In this embodiment, the two branch windings in each phase of each pole may jointly multiplex two stator slots 11. A quantity of layers of the first branch winding and a quantity of layers of the second branch winding may both be 2M. For example, the quantity of layers of the first branch winding and the quantity of layers of the second branch winding may both be four (namely, M=2), and two layers of the first branch winding may be located in the L1 layer and the L3 layer in the stator slot 11, and the L2 layer and the L4 layer in the stator slot 11 may be two layers in which the second branch winding is wound. The other two layers of the first branch winding are located in the L2 layer and the L4 layer of the adjacent stator slot 11, and the L1 layer and the L3 layer of the adjacent stator slot 11 may be the other two layers in which the second branch winding is wound. In this embodiment, the four layers of the first branch winding are uniformly distributed in two adjacent stator slots 11. Correspondingly, the four layers of the second branch winding are uniformly distributed in two adjacent stator slots 11 in which the first branch winding is wound. In this way, each stator slot 11 has two layers of the first branch winding and two layers of the second branch winding, and the two layers of the first branch winding and the two layers of the second branch winding are alternately arranged.

It should be understood that, that the first branch winding and the second branch winding are alternately arranged in a same stator slot 11 means that, the L1 layer of the stator slot 11 may be the first branch winding, the L2 layer of the stator slot 11 may be the second branch winding, the L3 layer of the stator slot 11 may be the first branch winding, and the L4 layer of the stator slot 11 may be the second branch winding. Two adjacent layers in a same stator slot 11 may be two different branch windings of a same phase of wave winding.

In this embodiment, the first branch winding and the second branch winding are alternately arranged in a same stator slot 11. In this way, two parallel branch windings of each phase of wave winding are uniformly and symmetrically distributed in the layers of the same stator slot 11, and potentials of the branch windings of each phase of wave winding are balanced, to avoid generation of a loop current, and reduce losses, thereby improving efficiency of the motor.

When each phase of wave winding is wound in 2M layers in the stator slot, and when q=2, and a=2, a winding manner of a first branch winding in any phase of wave winding is:

$X_1 - [X+12 \times 1]_2 - [X+12 \times 2]_1 - [X+12 \times 3]_2 \ldots -[X+12 \times (P-1)]_2-$ $X_3 - [X+12 \times 1]_4 - [X+12 \times 2]_3 - [X+12 \times 3]_4 \ldots -[X+12 \times (P-1)]_4-$ $\ldots$ $X_{2M-1} - [X+12 \times 1]_{2M} - [X+12 \times 2]_{2M-1} - [X+12 \times 3]_{2M} \ldots -[X+12 \times (P-1)]_{2M}-$ $[X+1]_{2M} - [X+1+12 \times (P-1)]_{2M-1} - [X+1+12 \times (P-2)]_{2M} - [X+1+12 \times (P-3)]_{2M-1} \ldots$ $\ldots -[X+1+12]_{2M-1}-$ $\ldots$ $[X+1]_4 - [X+1+12 \times (P-1)]_3 - [X+1+12 \times (P-2)]_4 - [X+1+12 \times (P-3)]_3 \ldots -[X+1+12]_3-$ $[X+1]_2 - [X+1+12 \times (P-1)]_1 - [X+1+12 \times (P-2)]_2 - [X+1+12 \times (P-3)]_1 \ldots -[X+1+12]_1$ X is less than 13, and the first branch winding of each phase of wave winding is wound in M layers in one of the stator slots of each pole to form a third coil, the first branch winding of each phase of wave winding is wound in M layers in the other adjacent stator slot of each pole to form a fourth coil, and the third coil is connected in series to the fourth coil, and a difference between phases of the third coil and the fourth coil is 30/q degrees.

A winding manner of a second branch winding in any phase of wave winding is:

$[X+1]_1 - [X+1+12 \times 1]_2 - [X+1+12 \times 2]_1 - [X+1+12 \times 3]_2 \ldots -[X+1+12 \times (P-1)]_2-$ $[X+1]_3 - [X+1+12 \times 1]_4 - [X+1+12 \times 2]_3 - [X+1+12 \times 3]_4 \ldots -[X+1+12 \times (P-1)]_4-$ $\ldots$ $[X+1]_{2M-1} - [X+1+12 \times 1]_{2M} - [X+12 \times 2]_{2M-1} - [X+12 \times 3]_{2M} \ldots -[X+12 \times (P-1)]_{2M}-$ $[X]_{2M} - [X+12 \times (P-1)]_{2M-1} - [X+12 \times (P-2)]_{2M} - [X+12 \times (P-3)]_{2M-1} \ldots -[X+12]_{2M-1}-$ $\ldots$ $[X]_4 [X+12 \times (P-1)]_3 - [X+12 \times (P-2)]_4 - [X+12 \times (P-3)]_3 \ldots -[X+12]_3-$ $[X]_2 - [X+12 \times (P-1)]_1 - [X+12 \times (P-2)]_2 - [X+12 \times (P-3)]_1 \ldots -[X+12]_1$ The second branch winding of each phase of wave winding is wound in M layers in one of the stator slots of each pole to form a fifth coil, the second branch winding of each phase of wave winding is wound in M layers in the other adjacent stator slot of each pole to form a sixth coil, and the fifth coil is connected in series to the sixth coil, and a difference between phases of the sixth coil and the fifth coil is 30/q degrees.

For example, in this embodiment, when M=2, each phase of wave winding is wound in four layers in the stator slot 11, and the first branch winding in any phase of wave winding may be wound starting from an Xth slot (X is less than 13), and a winding manner is as follows:

$X_1 - [X+12 \times 1]_2 - [X+12 \times 2]_1 - [X+12 \times 3]_2 \ldots -[+12 \times (P-1)]_2-$ $X_3 - [X+12 \times 1]_4 - [X+12 \times 2]_3 - [X+12 \times 3]_4 \ldots -[X+12 \times (P-1)]_4-$ $[X+1]_4 - [X+1+12 \times (P-1)]_3 - [X+1+12 \times (P-2)]_4 - [X+1+12 \times (P-3)]_3 \ldots -[X+1+12]_3-$ $[X+1]_2 - [X+1+12 \times (P-1)]_1 - [X+1+12 \times (P-2)]_2 - [X+1+12 \times (P-3)]_1 \ldots -[X+1+12]_1$ The first branch winding may be first wound in two layers in one of the stator slots 11 of each pole, to form the third coil, and then wound in other two layers in the other stator slot 11 of each pole, to form the fourth coil. The third coil is connected in series to the fourth coil. A difference between phases of the third coil and the fourth coil is 30/q degrees.

Next, the second branch winding in any phase of wave winding may be wound starting from an (X+1)th slot (X is less than 13), and a winding manner is:

$[X+1]_1 - [X+1+12\times1]_2 - [X+1+12\times2]_1 - [X+1+12\times3]_2 \ldots - [X+1+12\times(P-1)]_2 -$ $[X+1]_3 - [X+1+12\times1]_4 - [X+1+12\times2]_3 - [X+1+12\times3]_4 \ldots - [X+1+12\times(P-1)]_4 -$ $X_4 - [X+12\times(P-1)]_3 - [X+12\times(P-2)]_4 - [X+12\times(P-3)]_3 \ldots - [X+12\times1]_3 -$ $X_2 - [X+12\times(P-1)]_1 - [X+12\times(P-2)]_2 - [X+12\times(P-3)]_1 \ldots - [X+12\times1]_1.$ The second branch winding may be first wound in two layers in one of the stator slots 11 of each pole, to form the fifth coil, and then wound in other two layers in the other stator slot 11 of each pole, to form the sixth coil. The fifth coil is connected in series to the sixth coil. A difference between phases of the fifth coil and the sixth coil is 30/q degrees.

The first branch winding of each phase of wave winding has a fourth jumper 254d, and the second branch winding of each phase of wave winding has a fifth jumper 255d. Two ends of the fourth jumper 254d are respectively connected to a (2M)th layer of an $[X+12\times(P-1)]^{th}$ slot and an (2M)th layer of the (X+1)th slot; and two ends of the fifth jumper 255d are respectively connected to a (2M)th layer of an $[X+1+12\times(P-1)]^{th}$ slot and an (2M)th layer of the Xth slot.

Figure 18:
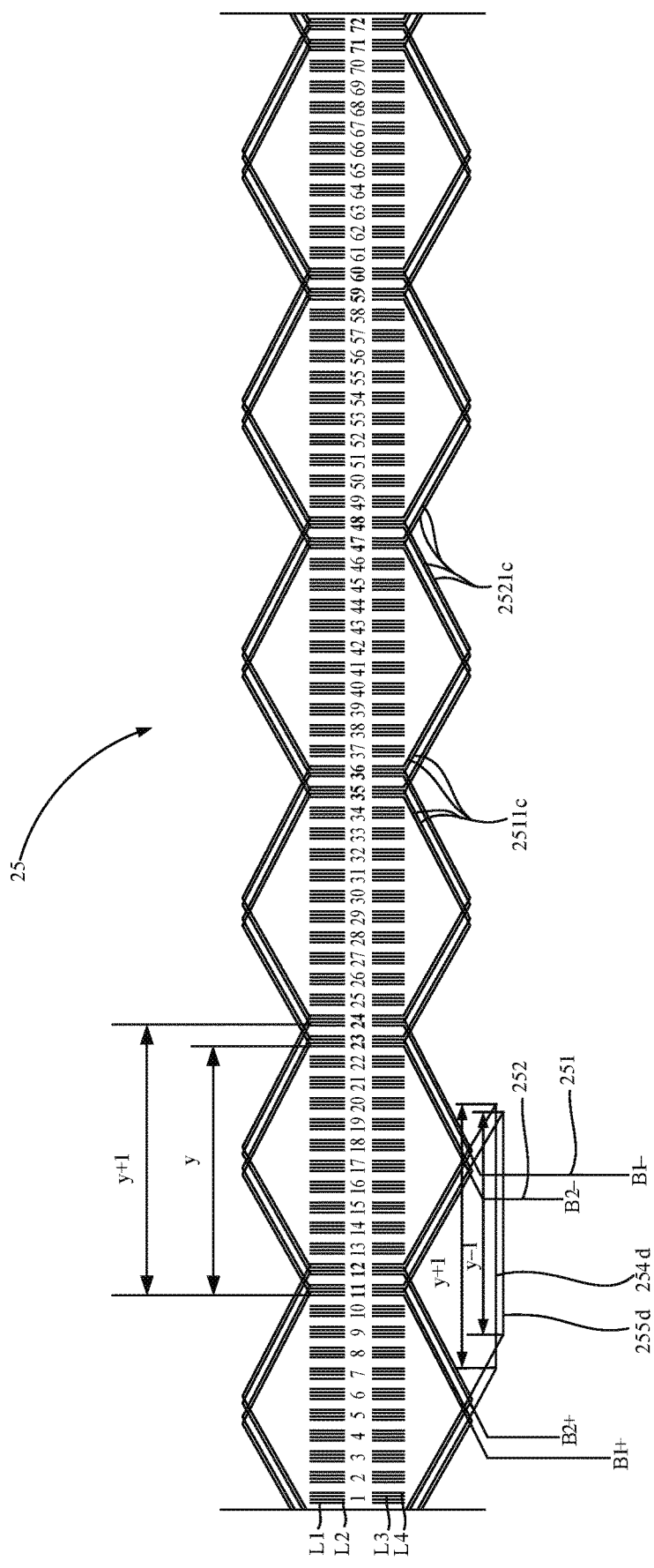
FIG. 18 is a schematic diagram of an unfolded U-phase wave winding when q=2 and a=2 in a six-phase motor according to an embodiment.

As shown in FIG. 18, a span of the fourth jumper 254d is y+1, a span of the fifth jumper 255d is y−1, and y is 6q. In this embodiment, q=2. Therefore, y=12, the span of the fourth jumper 254d is 13, and the span of the fifth jumper 255d is 11.

Spans between welding ends and non-welding ends of coils of phases of wave windings are equal and are all y. I The spans between welding ends and non-welding ends of the coils of the phases of wave windings may equal and may all be 12.

In this embodiment, the third coil is connected in series to the fourth coil by using the fourth jumper 254d, and the fifth coil is connected in series to the sixth coil by using the fifth jumper 255d.

For example, in this embodiment, P=6, q=2, and a=2. As shown in FIG. 18, the B-phase wave winding 25 includes a first B-phase branch winding 251 and a second B-phase branch winding 252. That is, the B-phase wave winding 25 includes a B1-phase branch winding and a B2-phase branch winding. The first B-phase branch winding 251 includes a wire-in end B1+ and a wire-out end B1−. There is a wire 2511c between the wire-in end B1+ and the wire-out end B1−. The wire 2511c may include two end portions and an effective edge that are located in the stator slots 11 (as shown in FIG. 16). The wire 2511c may include the foregoing third coil and fourth coil. The third coil is connected in series to the fourth coil by using the fourth jumper 254d.

The second B-phase branch winding 252 includes a wire-in end B2+ and a wire-out end B2−, and there is a wire 2521c between the wire-in end B2+ and the wire-out end B2−. The wire 2521c includes the fifth coil and the sixth coil. The fifth coil is connected in series to the sixth coil by using the fifth jumper 255d.

A span between the wire-in end and the wire-out end of the first branch winding of each phase of wave winding is y+1, and a span between the wire-in end and the wire-out end of the second branch winding of each phase of wave winding is y−1. For example, as shown in FIG. 18, the span between the wire-in end B1+ and the wire-out end B1− of the first B-phase branch winding 251 is y+1, and the span between the wire-in end B2+ and the wire-out end B2− of the second B-phase branch winding 252 is y−1, where y=6q. Therefore, when q=2, y=12, the span between the wire-in end B1+ and the wire-out end B1− of the first B-phase branch winding 251 is 13, and the span between the wire-in end B2+ and the wire-out end B2− of the second B-phase branch winding 252 is 11.

As shown in FIG. 18, when M=2, the first B-phase branch winding 251 (namely, B1) of the B-phase wave winding 25 is wound starting from the Xth slot (for example, X=11), and a winding manner is:

$X_1 - [X+12]_2 - [X+24]_1 - [X+36]_2 - [X+48]_1 - [X+60]_2 -$ $X_3 - [X+12]_4 - [X+24]_3 - [X+36]_4 - [X+48]_3 - [X+60]_4 -$ $[X+1]_4 - [X+61]_3 - [X+49]_4 - [X+37]_3 - [X+25]_4 - [X+13]_3 -$ $[X+1]_2 - [X+61]_1 - [X+49]_2 - [X+37]_1 - [X+25]_2 - [X+13]_1.$

The second B-phase branch winding 252 (namely, B1) of the B-phase wave winding 25 is wound starting from the (X+1)th slot (for example, X=11), and a winding manner is:

$[X+1]_1 - [X+13]_2 - [X+25]_1 - [X+37]_2 - [X+49]_1 - [X+61]_2 -$ $[X+1]_3 - [X+13]_4 - [X+25]_3 - [X+37]_4 - [X+49]_3 - [X+61]_4 -$ $X_4 - [X+60]_3 - [X+48]_4 - [X+36]_3 - [X+24]_4 - [X+12]_3 -$ $X_2 - [X+60]_1 - [X+48]_2 - [X+36]_1 - [X+24]_2 - [X+12]_1.$

As shown in FIG. 18, the first B-phase branch winding 251 of the B-phase wave winding 25 has the fourth jumper 254d. When X=11, two ends of the fourth jumper 254d are respectively connected to the L4 layer of the 71st slot and the L4 layer of the 12th slot; the second B-phase branch winding 252 of the B-phase wave winding 25 has the fifth jumper 255d, and two ends of the fifth jumper 255d are respectively connected to the L4 layer of the 72nd slot and the L4 layer of the 11th slot.

It should be noted that, FIG. 18 shows that the two parallel branches of the B-phase wave winding 25 select to be wound respectively starting from the 11th slot (namely, X=11) and the 12th slot (namely, X=12). In some other embodiments, X may alternatively be 13 or 14, for example, the two parallel branches select to be wound respectively starting from the 14th slot and the 13th slot.

In this embodiment, two branch windings of the U-phase wave winding 21 may be wound starting from the first slot and the second slot. Two branch windings of the A-phase wave winding 24 may be wound starting from the third slot and the fourth slot. Two branch windings of the W-phase wave winding 23 may be wound starting from the fifth slot and the sixth slot. Two branch windings of the C-phase wave winding 26 may be wound starting from the seventh slot and the eighth slot. Two branch windings of the V-phase wave winding 22 may be wound starting from the ninth slot and the 10th slot. The two branch windings of the B-phase wave winding 25 may be wound starting from the 11th slot and the 12th slot. After winding ends, refer to Table 3 for distribution of four layers of winding in the stator slots 11.

TABLE 3

(q = 2, a = 2)

| S1 | S2 | S3 | S4 | S5 | S6 | S7 | S8 | S9 | S10 | S11 | S12 | S13 | S14 | S15 | S16 |
|---|---|---|---|---|---|---|---|---|---|---|---|---|---|---|---|
| U1+ | U2+ | A1+ | A2+ | W1− | W2− | C1− | C2− | V1+ | V2+ | B1+ | B2+ | U1− | U2− | A1− | A2− |
| U2+ | U1+ | A2+ | A1+ | W2− | W1− | C2− | C1− | V2+ | V1+ | B2+ | B1+ | U2− | U1− | A2− | A1− |
| U1+ | U2+ | A1+ | A2+ | W1− | W2− | C1− | C2− | V1+ | V2+ | B1+ | B2+ | U1− | U2− | A1− | A2− |
| U2+ | U1+ | A2+ | A1+ | W2− | W1− | C2− | C1− | V2+ | V1+ | B2+ | B1+ | U2− | U1− | A2− | A1− |

| S17 | S18 | S19 | S20 | S21 | S22 | S23 | S24 | S25 | S26 | S27 | S28 | S29 | S30 | S31 | S32 |
|---|---|---|---|---|---|---|---|---|---|---|---|---|---|---|---|
| W1+ | W2+ | C1+ | C2+ | V1− | V2− | B1− | B2− | U1+ | U2+ | A1+ | A2+ | W1− | W2− | C1− | C2− |
| W2+ | W1+ | C2+ | C1+ | V2− | V1− | B2− | B1− | U2+ | U1+ | A2+ | A1+ | W2− | W1− | C2− | C1− |
| W1+ | W2+ | C1+ | C2+ | V1− | V2− | B1− | B2− | U1+ | U2+ | A1+ | A2+ | W1− | W2− | C1− | C2− |
| W2+ | W1+ | C2+ | C1+ | V2− | V1− | B2− | B1− | U2+ | U1+ | A2+ | A1+ | W2− | W1− | C2− | C1− |

| S33 | S34 | S35 | S36 | S37 | S38 | S39 | S40 | S41 | S42 | S43 | S44 | S45 | S46 | S47 | S48 |
|---|---|---|---|---|---|---|---|---|---|---|---|---|---|---|---|
| V1+ | V2+ | B1+ | B2+ | U1− | U2− | A1− | A2− | W1+ | W2+ | C1+ | C2+ | V1− | V2− | B1− | B2− |
| V2+ | V1+ | B2+ | B1+ | U2− | U1− | A2− | A1− | W2+ | W1+ | C2+ | C1+ | V2− | V1− | B2− | B1− |
| V1+ | V2+ | B1+ | B2+ | U1− | U2− | A1− | A2− | W1+ | W2+ | C1+ | C2+ | V1− | V2− | B1− | B2− |
| V2+ | V1+ | B2+ | B1+ | U2− | U1− | A2− | A1− | W2+ | W1+ | C2+ | C1+ | V2− | V1− | B2− | B1− |

| S49 | S50 | S51 | S52 | S53 | S54 | S55 | S56 | S57 | S58 | S59 | S60 | S61 | S62 | S63 | S64 |
|---|---|---|---|---|---|---|---|---|---|---|---|---|---|---|---|
| U1+ | U2+ | A1+ | A2+ | W1− | W2− | C1− | C2− | V1+ | V2+ | B1+ | B2+ | U1− | U2− | A1− | A2− |
| U2+ | U1+ | A2+ | A1+ | W2− | W1− | C2− | C1− | V2+ | V1+ | B2+ | B1+ | U2− | U1− | A2− | A1− |
| U1+ | U2+ | A1+ | A2+ | W1− | W2− | C1− | C2− | V1+ | V2+ | B1+ | B2+ | U1− | U2− | A1− | A2− |
| U2+ | U1+ | A2+ | A1+ | W2− | W1− | C2− | C1− | V2+ | V1+ | B2+ | B1+ | U2− | U1− | A2− | A1− |

| S65 | S66 | S67 | S68 | S69 | S70 | S71 | S72 |
|---|---|---|---|---|---|---|---|
| W1+ | W2+ | C1+ | C2+ | V1− | V2− | B1− | B2− |
| W2+ | W1+ | C2+ | C1+ | V2− | V1− | B2− | B1− |
| W1+ | W2+ | C1+ | C2+ | V1− | V2− | B1− | B2− |
| W2+ | W1+ | C2+ | C1+ | V2− | V1− | B2− | B1− |

It can be understood from Table 3 that, the first branch winding and the second branch winding are alternately arranged in each stator slot 11, and layers of winding in two adjacent stator slots 11 in which each phase of wave winding in each pole is wound are uniformly and symmetrically distributed, and potentials of the branches are balanced, and there is no loop current.

In this embodiment, winding may alternatively be performed in six layers in each stator slot. For example, if M=3 and q=6, the first branch winding in any phase of wave winding may be wound starting from the Xth slot (X is less than 13), and a winding manner is as follows:

$$X_1-[X+12\times1]_2-[X+12\times2]_1-[X+12\times3]_2 \ldots -[X+12\times(P-1)]_2-$$

$$X_3-[X+12\times1]_4-[X+12\times2]_3-[X+12\times3]_4 \ldots -[X+12\times(P-1)]_4-$$

$$X_5-[X+12\times1]_6-[X+12\times2]_5-[X+12\times3]_6 \ldots -[X+12\times(P-1)]_6-$$

$$[X+1]_6-[X+1+12\times(P-1)]_5-[X+1+12\times(P-2)]_6-[X+1+12\times(P-3)]_5 \ldots -[X+1+12]_5-$$

$$[X+1]_4-[X+1+12\times(P-1)]_3-[X+1+12\times(P-2)]_4-[X+1+12\times(P-3)]_3 \ldots -[X+1+12]_3-$$

$$[X+1]_2-[X+1+12\times(P-1)]_1-[X+1+12\times(P-2)]_2-[X+1+12\times(P-3)]_1 \ldots -[X+1+12]_1$$

The first branch winding may be first wound in three layers in one of the stator slots 11 of each pole, to form the third coil, and \then wound in other three layers in the other adjacent stator slot 11 of each pole, to form the fourth coil. The third coil is connected in series to the fourth coil. A difference between phases of the third coil and the fourth coil is 30/q degrees.

Next, the second branch winding in any phase of wave winding may be wound starting from the (X+1)th slot (X is less than 13), and the winding manner is:

$$[X+1]_1-[X+1+12\times1]_2-[X+1+12\times2]_1-[X+1+12\times3]_2 \ldots -[X+1+12\times(P-1)]_2-$$

$$[X+1]_3-[X+1+12\times1]_4-[X+1+12\times2]_3-[X+1+12\times3]_4 \ldots -[X+1+12\times(P-1)]_4-$$

$$[X+1]_5-[X+1+12\times1]_6-[X+1+12\times2]_5-[X+1+12\times3]_6 \ldots -[X+1+12\times(P-1)]_6-$$

$$X_6-[X+12\times(P-1)]_5-[X+12\times(P-2)]_6-[X+12\times(P-3)]_5 \ldots -[X+12\times1]_5-$$

$$X_4-[X+12\times(P-1)]_3-[X+12\times(P-2)]_4-[X+12\times(P-3)]_3 \ldots -[X+12\times1]_3-$$

$$X_2-[X+12\times(P-1)]_1-[X+12\times(P-2)]_2-[X+12\times(P-3)]_1 \ldots -[X+12\times1]_1.$$

I The second branch winding may be first wound in three layers in one of the stator slots 11 of each pole, to form the fifth coil, and then wound in other three layers in the other adjacent stator slot 11 of each pole, to form the sixth coil. The fifth coil is connected in series to the sixth coil. A difference between phases of the fifth coil and the sixth coil is 30/q degrees.

It should be noted that, in this embodiment, description is provided by using an example in which winding is performed in four layers and six layers in the stator slot. In actual application, quantities of winding layers of each stator slot 11 include but are not limited to four and six, or may be two, eight, or the like. Refer to the winding manner of four layers and six layers for the winding manner.

An embodiment further provides a powertrain. The powertrain may be applied to an electric vehicle/electric automobile (EV), a pure electric vehicle (PEV/BEV), a hybrid electric vehicle (HEV), a range extended electric vehicle (REEV), a plug-in hybrid electric vehicle (PHEV), or a new energy vehicle, or may be applied to battery management, a motor & driver, a power converter, or another device.

The powertrain includes at least a speed reducer and the six-phase motor 100 in any one of the foregoing embodiments. The motor 100 is connected to the speed reducer (not shown) by using a rotating shaft. An output shaft of the six-phase motor 100 may be connected to the speed reducer, and the speed reducer may alternatively be integrated with the motor 100 into a reducing motor for use.

In the powertrain provided in this embodiment, the foregoing six-phase motor 100 is included, and an even number of layers of in-phase wave windings are wound in each stator slot. In this way, layers of the wave winding in a same stator slot are in-phase. Because insulating paper does not need to be disposed between the in-phase layers of the wave winding for isolation, the insulating paper is prevented from being disposed between the layers of the wave winding in a same stator slot, so that an available space in the stator slot increases. In this way, a cross-sectional area of the wave winding that can be accommodated in the stator slot increases, to further help increase a slot fill factor. In this way, a magnitude of a current flowing through the wave winding in the stator slot increases, to help increase an output torque of the motor, so that the powertrain is applicable to a plurality of vehicles with different torque requirements. In addition, the insulating paper is prevented from being disposed in each stator slot, so that costs of the motor are reduced. In addition, each phase of the wave winding has conductors in all layers of a same stator slot, and the six-phase flat wire wave winding structure includes two symmetrical three-phase wave windings, phases of the wave winding are uniformly and symmetrically distributed, and potentials of branches are balanced. There is no loop current, and harmonic is counteracted, so that performance of the powertrain is better. In addition, the layers of the wave winding in the same stator slot are in-phase, so that problems that a flat wire winding process is highly difficult and manufacturing costs are high due to an increase in the quantity of phases of the six-phase motor are effectively resolved, thereby reducing the manufacturing costs of the powertrain.

An embodiment further provides a vehicle. The vehicle may be an electric vehicle/electric automobile (EV), a pure electric vehicle (PEV/BEV), a hybrid electric vehicle (HEV), a range extended electric vehicle (REEV), a plug-in hybrid electric vehicle (PHEV), a new energy vehicle, or the like.

The vehicle includes at least wheels, a transmission part, and the six-phase motor 100 in any one of the foregoing embodiments. The six-phase motor 100 is connected to the wheels by using the transmission part. A rotating shaft of the six-phase motor 100 may rotate to output power, and the transmission part may transmit power to the wheels to enable the wheels to rotate. Alternatively, in some embodiments, the vehicle includes at least the wheels, the transmission part, and the powertrain in the foregoing embodiment. An output shaft of the six-phase motor 100 in the powertrain may be connected to a speed reducer. The speed reducer may be connected to the transmission part. The transmission part is connected to the wheels.

In the vehicle provided in this embodiment, the foregoing six-phase motor 100 is included, and an even number of layers of in-phase wave windings are wound in each stator slot. In this way, layers of the wave winding in a same stator slot are in-phase. Because insulating paper does not need to be disposed between the in-phase layers of the wave winding for isolation, the insulating paper is prevented from being disposed between the layers of the wave winding in a same stator slot, so that an available space in the stator slot increases. In this way, a cross-sectional area of the wave winding that can be accommodated in the stator slot increases, to further help increase a slot fill factor. In this way, a magnitude of a current flowing through the wave winding in the stator slot increases, to help increase an output torque of the motor, so that the powertrain is applicable to a plurality of vehicles with different torque requirements. In addition, the insulating paper is prevented from being disposed in each stator slot, so that costs of the motor are reduced. In addition, each phase of the wave winding has conductors in all layers of a same stator slot, and the six-phase flat wire wave winding structure includes two symmetrical three-phase wave windings, phases of the wave winding are uniformly and symmetrically distributed, and potentials of branches are balanced. There is no loop current, and harmonic is counteracted, so that performance of the powertrain is better. In addition, the layers of the wave winding in the same stator slot are in-phase, so that problems that a flat wire winding process is highly difficult and manufacturing costs are high due to an increase in the quantity of phases of the six-phase motor are effectively resolved, thereby reducing the manufacturing costs of the vehicle.

In the descriptions, it should be noted that, unless otherwise specified or limited, terms such as "installation", "connected" and "connection" should be construed in a broad sense, for example, may be a fixed connection, may be an indirect connection through an intermediate medium, or may be an internal connection between two elements or an interaction relationship between two elements. A person of ordinary skill in the art may understand meanings of the foregoing terms.

An apparatus or element in the embodiments or an implied apparatus or element needs to have a specific direction and be constructed and operated in a specific direction, and therefore cannot be construed as a limitation in the embodiments. In the descriptions of the embodiments, "a" plurality or means two or more, unless otherwise precisely and specifically specified.

In the embodiments and the accompanying drawings, terms "first", "second", "third", "fourth", and the like (if existent) are intended to distinguish between similar objects but do not necessarily indicate a specific order or sequence. It should be understood that the data termed in such a way is interchangeable in proper circumstances so that embodiments described herein can be implemented in orders except the order illustrated or described herein. Moreover, the terms "include", "have", and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Finally, it should be noted that the foregoing embodiments are merely intended for describing the solutions and are not limiting. Although the solutions are described in detail with reference to the foregoing embodiments, persons of ordinary skill in the art should understand that they may still make modifications to the solutions described in the foregoing embodiments or make equivalent replacements to some or all features thereof, without departing from the scope of the embodiments.

What is claimed is:

1. A six-phase flat wire wave winding structure, comprising: a six-phase flat wire wave winding, wherein each phase of the six-phase flat wire wave winding comprises a wire-in end, a wire-out end, and a wire located between the wire-out end and the wire-in end;

each phase of the six-phase flat wire wave winding comprises a branch winding, and a quantity of stator slots in which each phase of the branch winding is wound is Pq, a total quantity of the stator slots is 6Pq, P is a quantity of poles of a motor, and q is a quantity of slots of each phase of the six-phase flat wire wave winding in each pole;

each of the stator slots has 2M layers of in-phase wave windings, and the in-phase wave windings in the stator slots have a same quantity of layers; the wire-in end and the wire-out end of each phase of the six-phase flat wire wave winding are both located at a bottom or an opening of the stator slots, and a and M are positive integers; and the six-phase flat wire wave winding comprises two symmetrical three-phase wave windings, and a difference between electrical angles of the two three-phase wave windings is 30 degrees, wherein each phase of the six-phase flat wire wave winding has 2M layers in the stator slot, and when the quantity q of the slots of each phase of the six-phase flat wire wave winding in each pole is 1, and a=1, a winding manner of any phase of the six-phase flat wire wave winding is:

$X_1 - [X+6 \times 1]_2 - [X+6 \times 2]_1 - [X+6 \times 3]_2 \ldots - [X+6 \times (P-1)]_2 -$ $X_3 - [X+6 \times 1]_4 - [X+6 \times 2]_3 - [X+6 \times 3]_4 \ldots - [X+6 \times (P-1)]_4 -$ $\ldots$ $X_{2M-1} - [X+6 \times 1]_{2M} - [X+6 \times 2]_{2M-1} - [X+6 \times 3]_{2M} \ldots - [X+6 \times (P-1)]_{2M} -$ $X_{2M} - [X+6 \times (P-1)]_{2M-1} - [X+6 \times (P-2)]_{2M} - [X+6 \times (P-3)]_{2M-1} \ldots - [X+6 \times 1]_{2M-1} -$ $\ldots$ $X_4 - [X+6 \times (P-1)]_3 - [X+6 \times (P-2)]_4 - [X+6 \times (P-3)]_3 \ldots - [X+6 \times 1]_3 -$ $X_2 - [X+6 \times (P-1)]_1 - [X+6 \times (P-2)]_2 - [X+6 \times (P-3)]_1 \ldots - [X+6 \times 1]_1$, wherein $X_{2M}$ represents a (2M)th layer of an Xth slot, $X_{2M-1}$ represents a (2M−1)th layer of the Xth slot, X represents the Xth slot in the stator slots, and X is less than 7.

2. The six-phase flat wire wave winding structure according to claim 1, wherein each phase of the six-phase flat wire wave winding has one jumper, and two ends of the jumper are respectively connected to a (2M)th layer of an [X+6×(P−1)]th slot and the (2M)th layer of the Xth slot.

3. The six-phase flat wire wave winding structure according to claim 2, wherein a span of the jumper of each phase of the six-phase flat wire wave winding is y; and spans between welding ends and non-welding ends of coils of phases of the six-phase flat wire wave winding are equal and are all y, and y is 6q.

4. A six-phase flat wire wave winding structure, comprising: a six-phase flat wire wave winding, wherein each phase of the six-phase flat wire wave winding comprises a wire-in end, a wire-out end, and a wire located between the wire-out end and the wire-in end;

each phase of the six-phase flat wire wave winding comprises a branch winding, and a quantity of stator slots in which each phase of the branch winding is wound is Pq, a total quantity of the stator slots is 6Pq, P is a quantity of poles of a motor, and q is a quantity of slots of each phase of the six-phase flat wire wave winding in each pole;

each of the stator slots has 2M layers of in-phase wave windings, and the in-phase wave windings in the stator slots have a same quantity of layers; the wire-in end and the wire-out end of each phase of the six-phase flat wire wave winding are both located at a bottom or an opening of the stator slots, and a and M are positive integers; and the six-phase flat wire wave winding comprises two symmetrical three-phase wave windings, and a difference between electrical angles of the two three-phase wave windings is 30 degrees, wherein each phase of the six-phase flat wire wave winding has 2M layers in the stator slot, and when the quantity q of the slots of each phase of the six-phase flat wire wave winding in each pole is 2, and a=1, a winding manner of any phase of the six-phase flat wire wave winding is:

$X_1 - [X+12 \times 1]_2 - [X+12 \times 2]_1 - [X+12 \times 3]_2 \ldots - [X+12 \times (P-1)]_2 -$ $X_3 - [X+12 \times 1]_4 - [X+12 \times 2]_3 - [X+12 \times 3]_4 \ldots - [X+12 \times (P-1)]_4 -$ $\ldots$ $X_{2M-1} - [X+12 \times 1]_{2M} - [X+12 \times 2]_{2M-1} - [X+12 \times 3]_{2M} \ldots - [X+12 \times (P-1)]_{2M} -$ $X_{2M} - [X+12 \times (P-1)]_{2M-1} - [X+12 \times (P-2)]_{2M} - [X+12 \times (P-3)]_{2M-1} \ldots - [X+12 \times 1]_{2M-1} -$ $\ldots$ $X_4 - [X+12 \times (P-1)]_3 - [X+12 \times (P-2)]_4 - [X+12 \times (P-3)]_3 \ldots - [X+12 \times 1]_3 -$ $X_2 - [X+12 \times (P-1)]_1 - [X+12 \times (P-2)]_2 - [X+12 \times (P-3)]_1 \ldots - [X+12 \times 1]_1 -$ $[X+1]_1 - [X+1+12 \times 1]_2 - [X+1+12 \times 2]_1 - [X+1+12 \times 3]_2 \ldots - [X+1+12 \times (P-1)]_2 -$ $[X+1]_3 - [X+1+12 \times 1]_4 - [X+1+12 \times 2]_3 - [X+1+12 \times 3]_4 \ldots - [X+1+12 \times (P-1)]_4 -$ $\ldots$ $[X+1]_{2M-1} - [X+1+12 \times 1]_{2M} - [X+1+12 \times 2]_{2M-1} - [X+1+12 \times 3]_{2M} \ldots - [X+1+12 \times (P-1)]_{2M} -$ $[X+1]_{2M} - [X+1+12 \times (P-1)]_{2M-1} - [X+1+12 \times (P-2)]_{2M} - [X+1+12 \times (P-3)]_{2M-1} \ldots - [X+1+12]_{2M-1} -$ $\ldots$ $[X+1]_4 - [X+1+12 \times (P-1)]_3 - [X+1+12 \times (P-2)]_4 - [X+1+12 \times (P-3)]_3 \ldots - [X+1+12]_3 -$ $[X+1]_2 - [X+1+12 \times (P-1)]_1 - [X+1+12 \times (P-2)]_2 - [X+1+12 \times (P-3)]_1 \ldots - [X+1+12]_1$ $X_{2M}$ represents a (2M)th layer of an Xth slot, $X_{2M-1}$ represents a (2M−1)th layer of the Xth slot, $[X+1]_{2M}$ represents a (2M)th layer of an (X+1)th slot, X represents the Xth slot in the stator slots, and X is less than 13.

5. The six-phase flat wire wave winding structure according to claim 4, wherein each phase of the six-phase flat wire wave winding has a first jumper, a second jumper, and a third jumper;

two ends of the first jumper are respectively connected to a (2M)th layer of an [X+12×(P−1)]th slot and the (2M)th layer of the Xth slot;

two ends of the second jumper are respectively connected to the first layer of an (X+12)th slot and the first layer of the (X+1)th slot; and two ends of the third jumper are respectively connected to a (2M)th layer of an [X+1+12×(P−1)]th slot and the (2M)th layer of the (X+1)th slot.

6. The six-phase flat wire wave winding structure according to claim 5, wherein a span of the first jumper is y, a span of the second jumper is y−1, and a span of the third jumper is y; and spans between welding ends and non-welding ends of coils of phases of the six-phase flat wire wave winding are equal and are all y, and y is 6q.

7. The six-phase flat wire wave winding structure according to claim 5, wherein each phase of the six-phase flat wire wave winding is wound in one of the stator slots in each pole to form a first coil, and each phase of the six-phase flat wire wave winding is wound in another one of the stator slots in each pole to form a second coil, and the first coil is connected in series to the second coil by using the second jumper; and a difference between phases of the first coil and the second coil is 30/q degrees.

8. A six-phase flat wire wave winding structure, comprising: a six-phase flat wire wave winding, wherein each phase of the six-phase flat wire wave winding comprises a wire-in end, a wire-out end, and a wire located between the wire-out end and the wire-in end;

each phase of the six-phase flat wire wave winding comprises a branch winding, and a quantity of stator slots in which each phase of the branch winding is wound is Pq, a total quantity of the stator slots is 6Pq, P is a quantity of poles of a motor, and q is a quantity of slots of each phase of the six-phase flat wire wave winding in each pole;

each of the stator slots has 2M layers of in-phase wave windings, and the in-phase wave windings in the stator slots have a same quantity of layers; the wire-in end and the wire-out end of each phase of the six-phase flat wire wave winding are both located at a bottom or an opening of the stator slots, and a and M are positive integers; and the six-phase flat wire wave winding comprises two symmetrical three-phase wave windings, and a difference between electrical angles of the two three-phase wave windings is 30 degrees, wherein each phase of the six-phase flat wire wave winding comprises a first branch winding and a second branch winding that are connected in parallel, and a winding manner of the second branch winding and a winding manner of the first branch winding are kept consistent and the second branch winding performs overall translation by one of the stator slots; and each of the stator slots has the first branch winding and the second branch winding that are in-phase and that have a same quantity of layers, and the first branch winding and the second branch winding are alternately arranged in the same stator slot, wherein when each phase of the six-phase flat wire wave winding has 2M layers in the stator slot, and when the quantity q of the slots of each phase of the wave winding in each pole is 2, and a=2, a winding manner of a first branch winding in any phase of the wave winding is:

$X_1 - [X+12\times1]_2 - [X+12\times2]_1 - [X+12\times3]_2 \ldots -[+12\times(P-1)]_2 -$ $X_3 - [X+12\times1]_4 - [X+12\times2]_3 - [X+12\times3]_4 \ldots -[X+12\times(P-1)]_4 -$ $\ldots$ $X_{2M-1} - [X+12\times1]_{2M} - [X+12\times2]_{2M-1} - [X+12\times3]_{2M} \ldots -[X+12\times(P-1)]_{2M} -$ $[X+1]_{2M} - [X+1+12\times(P-1)]_{2M-1} - [X+1+12\times(P-2)]_{2M} - [X+1+12\times(P-3)]_{2M-1} \ldots -[X+1+12]_{2M-1} -$ $\ldots$ $[X+1]_4 - [X+1+12\times(P-1)]_3 - [X+1+12\times(P-2)]_4 - [X+1+12\times(P-3)]_3 \ldots -[X+1+12]_3 -$ $[X+1]_2 - [X+1+12\times(P-1)]_1 - [X+1+12\times(P-2)]_2 - [X+1+12\times(P-3)]_1 \ldots -[X+1+12]_1$ $X_{2M-1}$ represents a (2M−1)th layer of an Xth slot, $[X+1]_{2M}$ represents a (2M)th layer of an (X+1)th slot, X represents the Xth slot in the stator slots, and X is less than 13.

9. The six-phase flat wire wave winding structure according to claim 8, wherein when each phase of the six-phase flat wire wave winding has 2M layers in the stator slot, and when the quantity q of the slots of each phase of the six-phase flat wire wave winding in each pole is 2, and a=2, a winding manner of a second branch winding in any phase of the six-phase flat wire wave winding is:

$[X+1]_1 - [X+1+12\times1]_2 - [X+1+12\times2]_1 - [X+1+12\times3]_2 \ldots -[X+1+12\times(P-1)]_2 -$ $[X+1]_3 - [X+1+12\times1]_4 - [X+1+12\times2]_3 - [X+1+12\times3]_4 \ldots -[X+1+12\times(P-1)]_4 -$ $\ldots$ $[X+1]_{2M-1} - [X+1+12\times1]_{2M} - [X+12\times2]_{2M-1} - [X+12\times3]_{2M} \ldots -[X+12\times(P-1)]_{2M} -$ $[X]_{2M} - [X+12\times(P-1)]_{2M-1} - [X+12\times(P-2)]_{2M} - [X+12\times(P-3)]_{2M-1} \ldots -[X+12]_{2M-1} -$ $\ldots$ $[X]_4 - [X+12\times(P-1)]_3 - [X+12\times(P-2)]_4 - [X+12\times(P-3)]_3 \ldots -[X+12]_3 -$ $[X]_2 - [X+12\times(P-1)]_1 - [X+12\times(P-2)]_2 - [X+12\times(P-3)]_1 \ldots -[X+12]_1.$ 10. The six-phase flat wire wave winding structure according to claim 9, wherein the first branch winding of each phase of the six-phase flat wire wave winding has a fourth jumper, and two ends of the fourth jumper are respectively connected to a (2M)th layer of an [X+12×(P−1)]th slot and the (2M)th layer of the (X+1)th slot; and the second branch winding of each phase of the six-phase flat wire wave winding has a fifth jumper, and two ends of the fifth jumper are respectively connected to a (2M)th layer of an [X+1+12×(P−1)]th slot and an (2M)th layer of the Xth slot.

11. The six-phase flat wire wave winding structure according to claim 10, wherein a span of the fourth jumper is y+1, and a span of the fifth jumper is y−1; and
spans between welding ends and non-welding ends of coils of phases of the six-phase flat wire wave winding are equal and are all y, and y is 6q.

12. The six-phase flat wire wave winding structure according to claim 10, wherein the first branch winding of each phase of the six-phase flat wire wave winding is separately wound in two of the stator slots in each pole to form a third coil and a fourth coil, and the third coil is connected in series to the fourth coil by using the fourth jumper; and
a difference between phases of the third coil and the fourth coil is 30/q degrees.

13. The six-phase flat wire wave winding structure according to claim 10, wherein the second branch winding of each phase of the six-phase flat wire wave winding is separately wound in two of the stator slots in each pole to form a fifth coil and a sixth coil, and the fifth coil is connected in series to the sixth coil by using the fifth jumper; and
a difference between phases of the fifth coil and the sixth coil is 30/q degrees.

14. A six-phase motor, comprising: at least a stator iron core and a six-phase flat wire wave winding structure, wherein the six-phase flat wire wave winding structure comprises a six-phase flat wire wave winding, wherein each phase of the six-phase flat wire wave winding comprises a wire-in end, a wire-out end, and a wire located between the wire-out end and the wire-in end;
each phase of the six-phase flat wire wave winding comprises a branch winding, and a quantity of stator slots in which each phase of the branch winding is wound is Pq, a total quantity of the stator slots is 6Pq, P is a quantity of poles of a motor, and q is a quantity of slots of each phase of the six-phase flat wire wave winding in each pole;
each of the stator slots has 2M layers of in-phase wave windings, and the in-phase wave windings in the stator slots have a same quantity of layers; the wire-in end and the wire-out end of each phase of the six-phase flat wire wave winding are both located at a bottom or an opening of the stator slot, and a and M are positive integers; and
the six-phase flat wire wave winding comprises two symmetrical three-phase wave windings, and a difference between electrical angles of the two three-phase wave windings is 30 degrees; and
a plurality of stator slots are disposed in an inner wall of the stator iron core in a peripheral direction;
a first part of the six-phase flat wire wave winding in the six-phase flat wire wave winding structure is wound in the stator slots, and a second part of the six-phase flat wire wave winding is located outside the stator slots; and
each of the stator slots has 2M layers of in-phase wave windings, and the in-phase wave windings in the stator slots have a same quantity of layers, and M is positive integer, wherein each phase of the six-phase flat wire wave winding has 2M layers in the stator slot, and when the quantity q of the slots of each phase of the six-phase flat wire wave winding in each pole is 1, and a=1, a winding manner of any phase of the six-phase flat wire wave winding is:

$X_1 - [X+6\times1]_2 - [X+6\times2]_1 - [X+6\times3]_2 \ldots - [X+6\times(P-1)]_2 -$ $X_3 - [X+6\times1]_4 - [X+6\times2]_3 - [X+6\times3]_4 \ldots - [X+6\times(P-1)]_4 -$ $\ldots$ $X_{2M-1} - [X+6\times1]_{2M} - [X+6\times2]_{2M-1} - [X+6\times3]_{2M} \ldots - [X+6\times(P-1)]_{2M} -$ $X_{2M} - [X+6\times(P-1)]_{2M-1} - [X+6\times(P-2)]_{2M} - [X+6\times(P-3)]_{2M-1} \ldots - [X+6\times1]_{2M-1} -$ $\ldots$ $X_4 - [X+6\times(P-1)]_3 - [X+6\times(P-2)]_4 - [X+6\times(P-3)]_3 \ldots - [X+6\times1]_3 -$ $X_2 - [X+6\times(P-1)]_1 - [X+6\times(P-2)]_2 - [X+6\times(P-3)]_1 \ldots - [X+6\times1]_1,$ wherein $X_{2M}$ represents a (2M)th layer of an Xth slot, $X_{2M-1}$ represents a (2M−1)th layer of the Xth slot, X represents the Xth slot in the stator slots, and X is less than 7.

15. The six-phase motor according to claim 14, wherein each phase of the six-phase flat wire wave winding has one jumper, and two ends of the jumper are respectively connected to a (2M)th layer of an [X+6×(P−1)]th slot and the (2M)th layer of the Xth slot.

16. A powertrain, comprising at least a speed reducer and a six-phase motor, and a six-phase flat wire wave winding structure comprising a six-phase flat wire wave winding, wherein each phase of the six-phase flat wire wave winding comprises a wire-in end, a wire-out end, and a wire located between the wire-out end and the wire-in end;
each phase of the six-phase flat wire wave winding comprises a branch winding, and a quantity of stator slots in which each phase of the branch winding is wound is Pq, a total quantity of the stator slots is 6Pq, P is a quantity of poles of a motor, and q is a quantity of slots of each phase of the six-phase flat wire wave winding in each pole;
each of the stator slots has 2M layers of in-phase wave windings, and the in-phase wave windings in the stator slots have a same quantity of layers; the wire-in end and the wire-out end of each phase of the six-phase flat wire wave winding are both located at a bottom or an opening of the stator slot, and a and M are positive integers; and
the six-phase flat wire wave winding comprises two symmetrical three-phase wave windings, and a difference between electrical angles of the two symmetrical three-phase wave windings is 30 degrees; and
a plurality of stator slots are disposed in an inner wall of the stator iron core in a peripheral direction;
a first part of the six-phase flat wire wave winding in the six-phase flat wire wave winding structure is wound in the stator slots, and a second part of the six-phase flat wire wave winding is located outside the stator slots; and each of the stator slots has 2M layers of in-phase wave windings, and the in-phase wave windings in the stator slots have a same quantity of layers, and M is positive integer; and the motor is connected to the speed reducer by using a rotating shaft, wherein each phase of the six-phase flat wire wave winding has 2M layers in the stator slot, and when the quantity q of the slots of each phase of the six-phase flat wire wave winding in each pole is 1, and a=1, a winding manner of any phase of the six-phase flat wire wave winding is:

$X_1 - [X+6 \times 1]_2 - [X+6 \times 2]_1 - [X+6 \times 3]_2 \ldots - [X+6 \times (P-1)]_2 -$ $X_3 - [X+6 \times 1]_4 - [X+6 \times 2]_3 - [X+6 \times 3]_4 \ldots - [X+6 \times (P-1)]_4 -$

. . .

$X_{2M-1} - [X+6 \times 1]_{2M} - [X+6 \times 2]_{2M-1} - [X+6 \times 3]_{2M} \ldots - [X+6 \times (P-1)]_{2M} -$ $X_{2M} - [X+6 \times (P-1)]_{2M-1} - [X+6 \times (P-2)]_{2M} - [X+6 \times (P-3)]_{2M-1} \ldots - [X+6 \times 1]_{2M-1} -$

. . .

$X_4 - [X+6 \times (P-1)]_3 - [X+6 \times (P-2)]_4 - [X+6 \times (P-3)]_3 \ldots - [X+6 \times 1]_3 -$ $X_2 - [X+6 \times (P-1)]_1 - [X+6 \times (P-2)]_2 - [X+6 \times (P-3)]_1 \ldots - [X+6 \times 1]_1$, wherein $X_{2M}$ represents a (2M)th layer of an Xth slot, $X_{2M-1}$ represents a (2M−1)th layer of the Xth slot, X represents the Xth slot in the stator slots, and X is less than 7.

* * * * *